US012647153B2

(12) United States Patent
Luo et al.

(10) Patent No.: US 12,647,153 B2
(45) Date of Patent: Jun. 2, 2026

(54) METHOD AND SYSTEM FOR CONTROLLING PHASE SHIFTS OF INTELLIGENT REFLECTING SURFACE

(71) Applicants: SHENZHEN RESEARCH INSTITUTE OF BIG DATA, Shenzhen (CN); THE CHINESE UNIVERSITY OF HONG KONG, SHENZHEN, Shenzhen (CN); HUAWEI TECHNOLOGIES CO., LTD., Shenzhen (CN)

(72) Inventors: Zhiquan Luo, Shenzhen (CN); Kaiming Shen, Shenzhen (CN); Yaowen Zhang, Shenzhen (CN); Shuyi Ren, Shenzhen (CN); Xin Li, Shenzhen (CN); Mingmin Wang, Shenzhen (CN); Xin Chen, Shenzhen (CN); Nan Zhang, Shenzhen (CN)

(73) Assignees: SHENZHEN RESEARCH INSTITUTE OF BIG DATA, Shenzhen (CN); THE CHINESE UNIVERSITY OF HONG KONG, SHENZHEN, Shenzhen (CN); HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 18/501,720

(22) Filed: Nov. 3, 2023

(65) Prior Publication Data

US 2024/0072848 A1 Feb. 29, 2024

Related U.S. Application Data

(63) Continuation of application No. PCT/CN2022/118261, filed on Sep. 9, 2022.

(30) Foreign Application Priority Data

Dec. 3, 2021 (CN) .......................... 202111470593.4

(51) Int. Cl.
*H04B 7/04* (2017.01)

(52) U.S. Cl.
CPC ................................. *H04B 7/04026* (2023.05)

(58) Field of Classification Search
CPC .................................................. H04B 7/04026
See application file for complete search history.

(56) References Cited

U.S. PATENT DOCUMENTS

2021/0288698 A1 9/2021 Chen et al.
2021/0344384 A1 11/2021 Dunna et al.
(Continued)

FOREIGN PATENT DOCUMENTS

CN 110266352 A 9/2019
CN 110444889 A 11/2019
(Continued)

OTHER PUBLICATIONS

Extended European Search Report mailed Feb. 11, 2025, issued in corresponding European Application No. 22 900 031.0, filed Sep. 9, 2022, 12 pages.
(Continued)

*Primary Examiner* — David Bilodeau
(74) *Attorney, Agent, or Firm* — Christensen O'Connor Johnson Kindness PLLC

(57) ABSTRACT
A method includes acquiring multiple pieces of first received signal quality information at a receiver, where the multiple pieces of first received signal quality information represent qualities of signals received at the receiver, generating first conditional sample statistical values based on the multiple pieces of first received signal quality information and phase shift arrays corresponding to the signals, determining the
(Continued)

phase shift processor

S301: acquiring multiple pieces of first received signal quality information at a receiver S302: generating first conditional sample statistical values according to the multiple pieces of first received signal quality information and phase shift arrays corresponding to the signals S303: determining a first phase shift array meeting a communication demand according to the communication demand and the first conditional sample statistical values phase shift controller S304: a first phase shift array S305: setting a phase shift value for at least one reflective element of the intelligent reflecting surface based on the first phase shift array first phase shift array that meets a communication requirement according to the first conditional sample statistical values, where the first phase shift array includes the phase shift value for at least one reflective element of an IRS, and configuring the IRS based on the first phase shift array.

18 Claims, 6 Drawing Sheets

(56) References Cited

U.S. PATENT DOCUMENTS

| | | | | |
|---|---|---|---|---|
| 2022/0216908 A1* | 7/2022 | Choi | ...................... | H04B 7/043 |
| 2023/0176174 A1* | 6/2023 | Penna | ...................... | H01Q 3/46 |
| | | | | 342/451 |
| 2023/0319507 A1* | 10/2023 | Gummadi | ............. | G01S 5/0009 |
| | | | | 455/456.1 |

FOREIGN PATENT DOCUMENTS

| | | |
|---|---|---|
| CN | 111211824 A | 5/2020 |
| CN | 111917448 A | 11/2020 |
| CN | 111954190 A | 11/2020 |
| CN | 110266352 B | 5/2021 |
| CN | 112804695 A | 5/2021 |
| CN | 113300749 A | 8/2021 |
| CN | 113364495 A | 9/2021 |
| CN | 114142898 A | 3/2022 |
| WO | 2021/109345 A1 | 6/2021 |
| WO | 2021/236510 A1 | 11/2021 |

OTHER PUBLICATIONS

Ren, S., et al., "Configuring Intelligent Reflecting Surface with Performance Guarantees: Blind Beamforming", arXiv:2112. 02285v2 [cs.IT], Nov. 3, 2022, pp. 1-12.
International Search Report and Written Opinion mailed Oct. 25, 2022 (with concise English description), issued in corresponding International Application No. PCT/CN2022/118261, filed Sep. 9, 2022, 17 pages.
Office Action mailed May 17, 2022, in corresponding Chinese application No. 202111470593.4, filed Dec. 3, 2021 (with concise English description), 9 pages.
Decision of Grant mailed Jul. 18, 2022, in corresponding Chinese application No. 202111470593.4, filed Dec. 3, 2021 (with concise English description), 4 pages.

* cited by examiner

700

800

METHOD AND SYSTEM FOR CONTROLLING PHASE SHIFTS OF INTELLIGENT REFLECTING SURFACE

CROSS REFERENCE TO RELATED APPLICATIONS

This application is a continuation application of Internal Patent Application No. PCT/CN2022/118261 filed on Sep. 9, 2022, which claims priority to Chinese Patent Application No. 202111470593.4, filed with the Chinese Patent Office on Dec. 3, 2021, entitled "PHASE SHIFT CONTROL METHOD AND DEVICE FOR INTELLIGENT REFLECTING SURFACE, AND STORAGE MEDIUM". The entire contents of both the applications are incorporated herein in its entirety.

TECHNICAL FIELD

The present disclosure relates to the technical field of communication technology, specifically concerning a method and a device for controlling phase shifts of an intelligent reflecting surface, as well as a storage medium.

BACKGROUND

Wireless signals are significantly weakened when passing through obstacles, and consequently the network coverage is limited. Although this problem may be addressed to some extent by deploying more base stations, the operational cost and energy consumption then increase considerably. An intelligent reflecting surface (IRS) is a novel wireless communication technology that effectively addresses this issue. By integrating numerous cost-effective passive reflective elements into the IRS, the wireless propagation environment can be intelligently reconfigured so as to improve the performance of the wireless communication network significantly.

According to the conventional schemes, in order to change the qualities of the received signals at the receiver side by using an IRS, channel information from the wireless propagation environment is essential. The qualities of the signals received at the receiver can be changed by tuning a phase shift array for the IRS.

In practical applications, however, in order to enable channel information acquisition from the wireless propagation environment, the existing communication protocol needs to be modified. This escalates the technical challenge and cost of the IRS.

SUMMARY

This present disclosure provides a method, device and storage medium for controlling phase shifts to change the quality of the signal at the receiver side.

In a first aspect, a method for controlling phase shifts of an IRS is provided. The method includes:

acquiring multiple pieces of first received signal quality information at a receiver which represent qualities of signals received at the receiver;

generating first conditional sample statistical values based on the multiple pieces of first received signal quality information and phase shift arrays corresponding to the signals, where the first conditional sample statistical values each represent an average value of the first received signal qualities acquired when the phase shift of a single reflective element of the IRS is fixed at a specific phase shift value while phase shift values of the remaining reflective elements are randomly selected; and determining a first phase shift array that meets a communication requirement according to the first conditional sample statistical values, where the first phase shift array includes a phase shift value for at least one reflective element of the IRS, the communication requirement including enhancing signal quality at the receiver or decreasing signal quality at the receiver; and configuring the IRS based on the first phase shift array.

In accordance with the first aspect, in a possible implementation, the communication requirement is to enhance the signal quality at the receiver. Based on the communication requirement and the first conditional sample statistical values, the determination of the first phase shift array includes:

acquiring a phase shift value based on the maximum value out of the first conditional statistical sample values for each reflective element, and forming the first phase shift array based on the acquired phase shift values;

or, determining a first phase shift array based on at least two first alternative phase shift arrays.

In accordance with the first aspect, in another possible implementation, the determination of the first phase shift array based on at least two first alternative phase shift arrays includes:

determining at least two first alternative phase shift arrays; acquiring multiple pieces of second received signal quality information which represent qualities of the received signals respectively corresponding to the first alternative phase shift arrays;

generating second conditional sample statistical values based on the multiple pieces of second received signal quality information and the first alternative phase shift arrays; and choosing the first alternative phase shift array that corresponds to the maximum value out of the second conditional sample statistical values as the first phase shift array.

In accordance with the first aspect, in another possible implementation, the communication requirement is to decrease signal quality at the receiver. The determination of the first phase shift array that meets the communication requirement according to the first conditional sample statistical values includes:

acquiring a phase shift value based on the minimum value out of the first conditional sample statistical values for each reflective element, and forming the first phase shift array based on the acquired phase shift values;

or, determining the first phase shift array based on at least two second alternative phase shift arrays.

In accordance with the first aspect, in another possible implementation, the determination of the first phase shift array based on at least two second alternative phase shift arrays includes:

determining the at least two second alternative phase shift arrays;

acquiring multiple pieces of third received signal quality information which represent qualities of the received signals respectively corresponding to the second alternative phase shift arrays;

generating third conditional sample statistical values based on the multiple pieces of third received signal quality information and the second alternative phase shift arrays; and choosing the second alternative phase shift array that corresponds to the minimum value out of the third conditional sample statistical values as the first phase shift array.

In accordance with the first aspect, in another possible implementation, the first phase shift array includes both a first phase shift sub-array and a second phase shift sub-array. The first phase shift sub-array includes phase shift values of $\lfloor Nx \rfloor$ reflective elements of the IRS, and the second phase shift sub-array includes phase shift values of $N-\lfloor Nx \rfloor$ reflective elements of the IRS, where $0 < x < 1$.

The determination of the first phase shift array that meets the communication requirement according to the first conditional sample statistical value includes:

acquiring a phase shift value based on the minimum value out of the first conditional sample statistical values for each of the $\lfloor Nx \rfloor$ reflective elements of the IRS;

forming the first phase shift sub-array based on the acquired phase shift values; and acquiring a phase shift value based on the maximum value out of the first conditional sample statistical values for each of the $N-\lfloor Nx \rfloor$ reflective elements of the IRS; and forming the second phase shift sub-array based on the acquired phase shift values.

In accordance with the first aspect, in another possible implementation, the IRS consists of N reflective elements. The first phase shift array includes phase shift values for $Y_1$ reflective elements of the IRS, where $1 \leq Y_1 \leq N$, and $Y_1$ and N are positive integers.

The method further includes:

acquiring fourth received signal quality information at the receiver which represent qualities of the received signals when phase shift values for the $Y_1$ reflective elements of the IRS are determined and phase shift values for the $N-Y_1$ reflective elements are not yet determined;

generating fourth conditional sample statistical values according to the fourth received signal quality information and the phase shift arrays corresponding to the signals;

determining a second phase shift array that meets the communication requirement according to the fourth conditional sample statistical values. The second phase shift array including phase shift values for $Y_2$ reflective elements of the IRS, where $1 \leq Y_2 \leq N-Y_1$, and $Y_2$ is a positive integer; and iteratively performing the previous steps until phase shift values for the N reflective elements of the IRS meet the communication requirement.

In accordance with the first aspect, in another possible implementation, the first received signal quality information is a piece of multi-dimensional signal quality information that represents multi-antenna transmission signal quality.

In accordance with the first aspect, in another possible implementation, the acquisition of the first received signal quality information at the receiver includes:

acquiring fifth received signal quality information at multiple receivers; and determining the first received signal quality information from the fifth received signal quality information at the multiple receivers.

In accordance with the first aspect, in another possible implementation, the method further includes receiving a set of phase shift array modes. The set of phase shift array modes consists of at least one of the following phase shift array modes:

acquiring a phase shift value based on the maximum value out of the first conditional sample statistical values for each reflective element, and forming the first phase shift array based on the acquired phase shift values;

determining the first phase shift array based on at least two first alternative phase shift arrays;

acquiring a phase shift value based on the minimum value out of the first conditional sample statistical values for each reflective element, and forming the first phase shift array based on the acquired phase shift values; and determining the first phase shift array based on at least two second alternative phase shift arrays.

A correspondence between at least one phase shift mode label and at least one phase shift array mode is stored. A selecting instruction from a user is received and contains a first phase shift array mode label. The phase shift array mode is chosen according to the first phase shift array mode label and the correspondence.

In accordance with the first aspect, in another possible implementation, the IRS has a two-dimensional or three-dimensional structure.

In accordance with the first aspect, in another possible implementation, the first received signal quality information includes at least one of the following: a reference signal received power (RSRP), a signal to interference plus noise ratio (SINR), a spectral efficiency, a transmission rate, a sum of transmission rates at multiple receivers, a bit error rate, or a time delay.

In a second aspect, a method for controlling phase shifts of an IRS is provided. The method includes receiving a first phase shift array which includes a phase shift value for at least one reflective element of an IRS that meets a communication requirement, and setting the phase shift value of the at least one reflective element for the IRS based on the first phase shift array.

In a third aspect, a method for controlling phase shifts of an IRS is provided. The method is applied to a system for controlling phase shifts of an IRS. The system includes an IRS, a signal detector, a phase shift processor, and a phase shift controller. The method includes:

detecting, by the signal detector, qualities of signals received at a receiver, and acquiring multiple pieces of first received signal quality information at the receiver, where the multiple pieces of first received signal quality information represent the qualities of the received signals;

outputting, by the signal detector, the multiple pieces of first received signal quality information to the phase shift processor;

acquiring, by the phase shift processor, the multiple pieces of first received signal quality information from the receiver;

generating, by the phase shift processor, first conditional sample statistical values based on the multiple pieces of first received signal quality information and the phase shift arrays corresponding to the signals;

determining, by the phase shift processor, a first phase shift array that meets a communication requirement according to the first conditional sample statistical values, which includes a phase shift value for at least one reflective element for the IRS, the communication requirement including enhancing signal quality at the receiver or decreasing signal quality at the receiver;

sending the first phase shift array to the phase shift controller by the phase shift processor;

using the first phase shift array as a reference, setting the phase shift value of the at least one reflective element for the IRS by the phase shift controller.

In a fourth aspect, a device for controlling phase shifts of an IRS is provided. The device is able to perform the foregoing method for controlling phase shifts of an IRS in the first aspect. For example, the device may be a chip or an apparatus. The previous method may be realized through software, hardware, or by executing software through hardware.

In a possible implementation, the device includes:

a first acquisition unit configured to acquire multiple pieces of first received signal quality information at a receiver which represent qualities of signals received at the receiver;

a first generating unit configured to generate first conditional sample statistical values based on the multiple pieces of first received signal quality information and phase shift arrays corresponding to the signals;

a first determination unit configured to determine a first phase shift array that meets a communication requirement according to the first conditional sample statistical values, the first phase shift array including a phase shift value for at least one reflective element for the IRS; and a transceiver unit configured to send the first phase shift array.

Alternatively, the communication requirement is to enhance signal quality at the receiver. The first determination unit includes:

a second acquisition unit configured to acquire a phase shift value based on the maximum value out of the first conditional sample statistical values for each reflective element, and form the first phase shift array based on the acquired phase shift values; or a second determination unit configured to determine the first phase shift array based on at least two first alternative phase shift arrays.

Alternatively, the second determination unit includes:

a third determination unit configured to determine the at least two first alternative phase shift arrays;

a third acquisition unit configured to acquire multiple pieces of second received signal quality information which represent qualities of the received signals respectively corresponding to the first alternative phase shift arrays;

a second generating unit configured to generate second conditional sample statistical values based on the multiple pieces of second received signal quality information and the first alternative phase shift arrays; and a fourth acquisition unit configured to choose the first alternative phase shift array that corresponds to the maximum value out of the second conditional sample statistical values as the first phase shift array.

Alternatively, the communication requirement is to decrease signal quality at the receiver. The first determination unit includes:

a fifth acquisition unit configured to acquire a phase shift value based on the minimum value out of the first conditional sample statistical values for each reflective element, and form the first phase shift array based on the acquired phase shift values; or a fourth determination unit configured to determine the first phase shift array based on at least two second alternative phase shift arrays.

Alternatively, the fourth determination unit includes:

a fifth determination unit configured to determine the at least two second alternative phase shift arrays;

a sixth acquisition unit configured to acquire multiple pieces of third received signal quality information which represent qualities of received signals respectively corresponding to the second alternative phase shift arrays;

a third generating unit configured to generate third conditional sample statistical values based on the multiple pieces of third received signal quality information and the second alternative phase shift arrays; and a seventh acquisition unit configured to choose the second alternative phase shift array that corresponds to the minimum value out of the third conditional sample statistical values as the first phase shift array.

Alternatively, the first phase shift array includes both a first phase shift sub-array and a second phase shift sub-array. The first phase shift sub-array includes phase shift values for $\lfloor Nx \rfloor$ reflective elements of the IRS, and the second phase shift sub-array includes phase shift values for $N - \lfloor Nx \rfloor$ reflective elements of the IRS.

The first determination unit includes:

an eighth acquisition unit configured to acquire a phase shift value based on the minimum value out of first conditional sample statistical values for each of the $\lfloor Nx \rfloor$ reflective elements of the IRS, and form a first phase shift sub-array based on the acquired phase shift values; and a ninth acquisition unit, configured to acquire a phase shift value based on the maximum value out of first conditional sample statistical values for each of the $N - \lfloor Nx \rfloor$ reflective elements of the IRS, and form a second phase shift sub-array based on the acquired phase shift values.

Alternatively, the IRS includes N reflective elements, the first phase shift array includes phase shift values for $Y_1$ reflective elements of the IRS, where $1 \le Y_1 \le N$, and $Y_1$ and N are positive integers.

The first acquisition unit is also configured to acquire fourth received signal quality information at the receiver. The fourth received signal quality information represent qualities of signals received at the receiver when phase shift values for the $Y_1$ reflective elements of the IRS are determined and phase shift values for the $N - Y_1$ reflective elements are not yet determined.

The first generating unit is also configured to generate fourth conditional sample statistical values according to the fourth received signal quality information and phase shift arrays of the signals.

The first determination unit is also configured to determine a second phase shift array that meets the communication requirement according to the fourth conditional sample statistical values. The second phase shift array includes phase shift values for $Y_2$ reflective elements of the IRS, where $1 \le Y_2 \le N - Y_1$, and $Y_2$ is a positive integer.

Alternatively, the first received signal quality information is a piece of multi-dimensional signal quality information that represents a multi-antenna transmission signal quality.

Alternatively, the first acquisition unit includes:

a tenth acquisition unit configured to acquire fifth received signal quality information from multiple receivers; and a sixth determination unit configured to determine the first received signal quality information from the fifth received signal quality information from the multiple receivers.

Alternatively, the transceiver unit is also configured to receive a set of phase shift array modes. The set of phase shift array modes consist of at least one of phase shift array modes as follows.

The device further includes:

an eleventh acquisition unit configured to acquire a phase shift value based on the maximum value out of first conditional sample statistical values for each reflective element, and form the first phase shift array based on the acquired phase shift values;

a seventh determination unit configured to determine the first phase shift array based on at least two first alternative phase shift arrays;

a twelfth acquisition unit configured to acquire a phase shift value based on the minimum value out of first conditional sample statistical values for each reflective element, and form the first phase shift array based on the acquired phase shift values; or an eighth determination unit configured to determine the first phase shift array based on at least two second alternative phase shift arrays;

a storage unit configured to store a correspondence between at least one phase shift mode label and at least one phase shift array mode;

the transceiver unit configured to receive a selecting instruction from a user which includes a first phase shift array mode label; and a selection unit configured to select a corresponding phase shift array mode according to the first phase shift array mode label and the correspondence.

Alternatively, the IRS may be in the shape of a folded book.

Alternatively, the first received signal quality information includes at least one of the following: an RSRP, an SINR, a spectral efficiency, a transmission rate, a sum of transmission rates at multiple receivers, a bit error rate, or a time delay.

In another possible implementation, the device for controlling phase shifts of the IRS is configured to perform the method for controlling phase shifts of the IRS described in the first aspect and various implementations thereof.

In a fifth aspect, a device for controlling phase shifts of an IRS is provided. The device is able to perform the foregoing method for controlling phase shifts of the IRS in the second aspect. For example, the device may be a chip or an apparatus. The above method may be realized through software, hardware, or by executing software by hardware.

In a possible implementation, the device includes:

a transceiver unit configured to receive a first phase shift array which includes a phase shift value for at least one reflective element of an IRS that meets a communication requirement; and a setting unit configured to set the phase shift value for at least one reflective element for the IRS according to the first phase shift array.

In another possible implementation, the device for controlling phase shifts of the IRS is configured to perform the method in the second aspect.

In another possible implementation, the device for controlling phase shifts of the IRS in the fourth or fifth aspect includes a processor coupled to a memory. The processor is configured to support the device to perform corresponding functions in the above-described method for controlling phase shifts of the IRS. The memory is coupled with the processor and stores computer programs (or computer-executable instructions) and/or data necessary to the device. Alternatively, the device for controlling intelligent reflecting phase shift may further include a communication interface configured to support communication between the device and other network elements, such as sending or receiving data and/or signals. Exemplarily, the communication interface may be a receiver, a circuit, a bus, a module, or other types of communication interfaces. The memory could be stored within the device that controls phase shift, integrated with the processor, or it could be externally situated.

When the device for controlling phase shifts of the IRS in the fourth or fifth aspect is a chip, a sending unit could be an output unit such as an output circuit or a communication interface. A receiving unit could be an input unit such as an input circuit or a communication interface. When the device for controlling phase shifts of the IRS is a terminal, the sending unit could be a transmitter or a transmitting machine, and the receiving unit could be a receiver or a receiving machine.

In a sixth aspect, a system for controlling phase shifts of an IRS is provided. The system includes an IRS, a signal detector, a phase shift processor, and a phase shift controller. The signal detector is configured to: detect qualities of signals received at a receiver, and acquire multiple pieces of first received signal quality information at the receiver which represent the qualities of the received signals. The signal detector is also configured to output the multiple pieces of first received signal quality information to the phase shift processor. The phase shift processor is configured to acquire the multiple pieces of first received signal quality information from the receiver, and generate first conditional sample statistical values based on the multiple pieces of first received signal quality information and phase shift arrays corresponding to the signals. The phase shift processor is also configured to determine a first phase shift array that meets a communication requirement according to the first conditional sample statistical values. The first phase shift array includes a phase shift value for at least one reflective element of the IRS. The phase shift processor is also configured to send the first phase shift array to the phase shift controller. The phase shift controller is configured to set the phase shift value of the at least one reflective element of the IRS according to the first phase shift array.

In a seventh aspect, a computer-readable storage medium is provided. The storage medium stores a computer program or instructions. When the program or the instructions are executed by the processor, the method or any one implementation of the method in the first aspect is performed, or the method in the second aspect is performed.

In an eighth aspect, a computer program product is provided. When the computer program product is executed on a computer device, the method in the first aspect or any implementation of the method in the first aspect is performed, or the method in the second aspect is performed.

DETAILED DESCRIPTION

The technical solution in the embodiment of the application will be described in detail in combination with the attached figures in the embodiment of the application.

Currently, to change the quality of received signals at the receiver by using the IRS, the channel state information of the wireless propagation environment needs to be acquired. The quality of the received signal at the receiver is changed by tuning the phase shift array of the IRS. However, it is not practical to acquire all channel state information in real communication.

For current communication technologies, the channel models in real communication scenarios are highly complex, with many multipaths. Hence, it is difficult to accurately determine the direction of arrival of a communication signal. Also, for communication scenarios with many multipaths, the IRS must have the capability of interacting with network devices in order to accurately acquire the channel state information, which requires an independent information transmission link. In the meanwhile, the IRS must be able to receive and process a communication signal. These functions are not supported by the existing network protocol architectures. In addition, the introduction of information interaction between the IRS and the network devices will greatly increase the deployment cost of the IRS, making it difficult to deploy the IRS on a large scale. At the same time, it will also increase power consumption, which is also contrary to the original intention of developing the IRS. Therefore, it is necessary to develop an encoding method for the IRS under the unknown channel.

To this end, this present disclosure provides a method for controlling phase shifts of an IRS and related products. According to a communication requirement and a first conditional sample statistical value, a first phase shift array that meets the communication requirement is determined, and the first phase shift array is sent, so that the phase shift value of the intelligent reflection surface is set accordingly. Then the quality of the received signal at a receiver can be flexibly changed according to the communication requirement.

According to the present disclosure, the IRS does not need to interact with any network devices and does not need the network devices to provide channel information and channel estimation. It only requires the quality of the signal received by the receiver. Based on the algorithm operation, the phase shift array of the IRS that meets the communication requirements in the current scenario is acquired.

Figure 1:
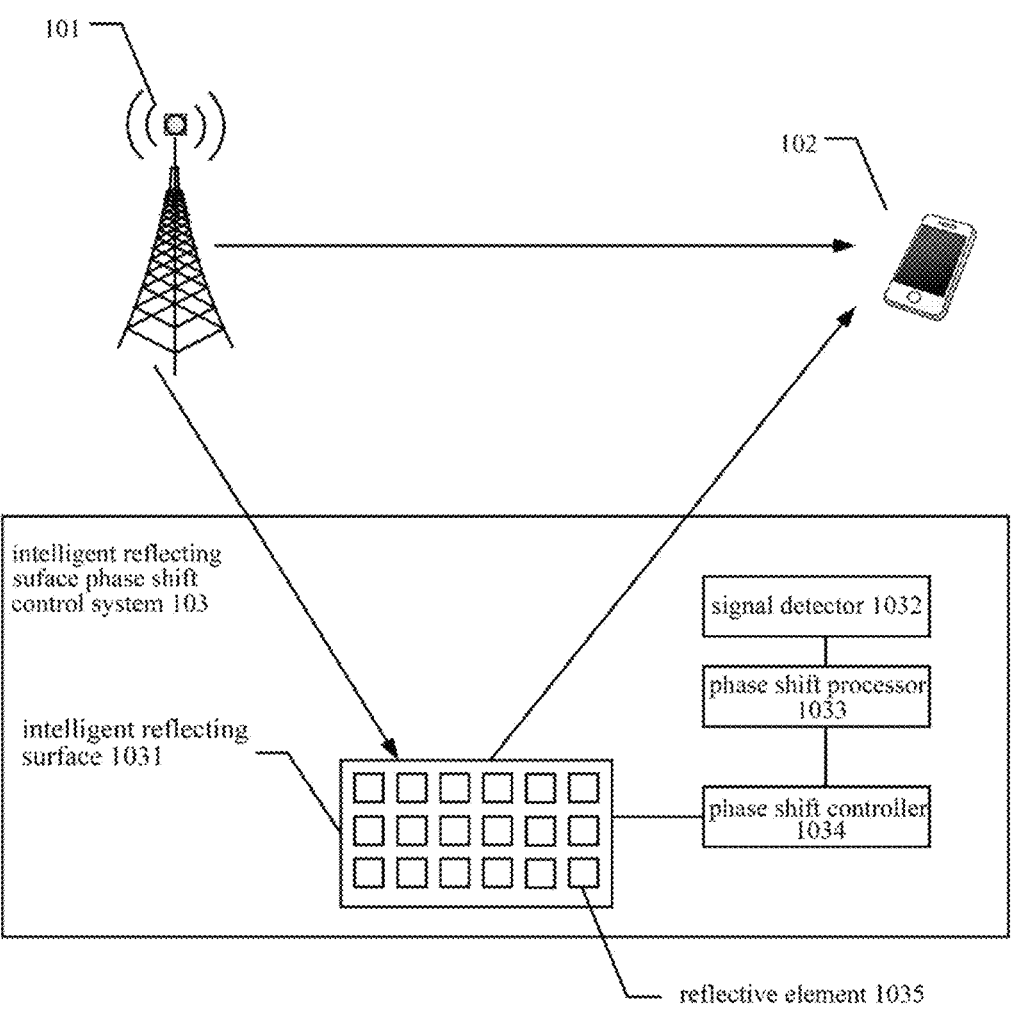
FIG. 1 is a schematic structural diagram of a communication system according to an embodiment of the present disclosure.

Reference may be made to FIG. 1 which is a schematic structural diagram of a communication system provided by the embodiment of the present disclosure. The communication system includes a network device 101, a receiver 102, and an IRS phase shift control system 103. The IRS phase shift control system includes an IRS 1031, a signal detector

1032, a phase shift processor 1033, and a phase shift controller 1034. The signal detector 1032 and the phase shift processor 1033 could be attached to the receiver 102, or could be independently installed. There might be wired or wireless (e.g., via Bluetooth or WiFi connection) connections among the signal detector 1032, the phase shift processor 1033, and the phase shift controller 1034. The phase shift processor 1034 could be attached to the IRS 1031, and could also be independently installed. It should be noted that the number and form corresponding to the network equipment 101, the receiver 102 and the IRS 1031 shown in FIG. 1 are for example only and do not constitute the limitation of the embodiment of this disclosure. For example, in a practical application, one receiver 102 may correspond to multiple IRSs 1031.

The signal detector 1032 is installed to detect the qualities of the received signal at the receiver to acquire multiple pieces of first received signal quality information at the receiver. The multiple pieces of first received signal quality information represent the qualities of the received signals.

The signal detector 1032 is also configured to output the first received signal quality information to the phase shift processor 1033.

The phase shift processor 1033 is configured to acquire the first received signal quality information from the receiver.

The phase shift processor 1033 is also configured to generate the first conditional sample statistical values according to the first received signal quality information and phase shift arrays corresponding to the signals.

The phase shift processor 1033 is also configured to determine a first phase shift array that meets a communication requirement according to the first conditional sample statistical values. The first phase shift array includes a phase shift value for at least one reflective element of the IRS.

The phase shift processor 1033 is also configured to send the first phase shift array to the phase shift controller.

The phase shift controller 1034 is configured to set the phase shift value for at least one reflective element of the IRS 1031 according to the first phase shift array.

That is, the phase shift controller 1034 is configured to control the beamforming codes of the IRS, the signal detector 1032 is configured to measure and collect the quality information of the communication signals at the receiver, and the phase shift processor 1033 determines the optimization suggestion according to sampling information provided by the signal detector and the corresponding beamforming codes provided by the phase shift controller 1034. And, the phase shift processor 1033 sends the optimization suggestion to the phase shift controller 1034.

Technical solutions of the embodiments of the present disclosure can be applied to various communication systems, e.g., a 3rd generation (3G) mobile communication system, a 4th generation (4G) mobile communication system, a 5th generation (5G) mobile communication system or other novel mobile communication systems in the future. The pre-mentioned communication system can also be a communication system that supports multiple wireless technologies simultaneously, e.g., a communication system that supports both long-term evolution (LTE) and new radio (NR). Alternatively, the pre-mentioned communication system may also be a communication system that supports near-field communication, e.g., a communication system that supports sidelink (SL), a communication system that supports wireless fidelity (WiFi), and so on.

The network device 101 in the embodiments of the present disclosure may be, for example, a base station, an evolved NodeB (eNodeB), a transmission reception point (TRP), a next generation NodeB (gNB) in a 5G mobile communication system, a gNB in a sixth generation (6G) communication system, a base station in a future mobile communication system, or an access point in a WiFi system. The network device 101 also could be a module or a unit that is responsible for part of the functions of the base station, for example, it may be a central unit (CU) or a distributed unit (DU). The network device 101 also could be a macro base station, a micro base station, or an indoor station. The network device 101 may further be a relay point, a donor point, etc. The specific technology and specific equipment form adopted by the network device 101 are not limited in the embodiments of the present disclosure. For ease of description, as an example, a base station is taken as the network device.

The receiver 102 of the embodiments of the present disclosure is an entity that is used to receive or transmit signals, e.g., a mobile phone. The receiver 102 can also include a terminal, user equipment (UE), mobile station (MS), a mobile terminal (MT), etc. The receiver 102 can also be a car with communication capabilities, an intelligent car, a mobile phone, a wearable device, a tablet, a computer with a wireless transmitting and receiving function, a virtual reality (VR) terminal device, an augmented reality (AR) terminal device, a wireless terminal for industrial control, a wireless terminal in self-driving, a wireless terminal in remote medical surgery, a wireless terminal in smart grid, a wireless terminal in transportation safety, a wireless terminal in smart city, or a wireless terminal in smart home, etc. The specific technology and the specific equipment form adopted by the receiver 102 are not limited by the embodiments of the present disclosure.

The surface of the IRS 1031 includes a large number of cost-effective passive reflective elements 1035 according to an embodiment of the present disclosure. By an appropriate way of encoding (i.e., setting a phase shift value for each reflective element of the IRS. After a phase shift is performed on a channel $h_n$ of the n-th reflective element, the channel becomes $h_n e^{j\theta_n}$, where $\theta_n$ is the phase shift value set for the n-th reflective element. And one set of beamforming codes corresponds to one set of phase shift values, respectively), the IRS 1031 is able to change the quality of a signal received at the receiver, expanding the wireless communication coverage of the network device. Furthermore, the interference signals may be decreased or offset by an appropriate way of encoding such that the communication experience at the receiver 102 can be improved. It can also increase the wireless channel multipath and reduce the channel correlation through the surface of the IRS, so as to improve the rank of the wireless channel and realize more stream transmission, which improves the communication experience of the receiver 102 Alternatively, it reduces the wireless channel multipath and improve the channel correlation through the surface of the IRS, thus reducing the rank of the wireless channel and reducing the transmission rate of the receiver 102 at a specific location. For time division duplex (TDD) technology, the uplink and downlink can be optimized together by tuning the phase shift array in the IRS, that is, the uplink channel quality can be optimized while the downlink channel quality is optimized. Due to the introduction of the IRS, the transmission power of the network device may be properly reduced while maintaining equivalent channel quality, so that the requirements of green networks and carbon neutrality can be met, and the function of saving energy in the networks can be achieved.

Figure 2:
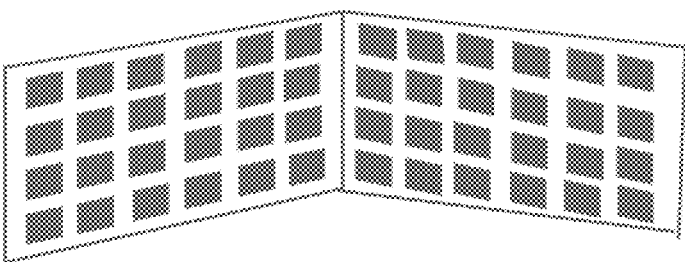
FIG. 2 is a schematic structural diagram of an IRS provided by an embodiment of the present disclosure.

As shown in FIG. 1, in the outdoor application scenario, the network device 101 sends out signals, some of which are transmitted directly to the receiver 102, and some of which are received by the receiver 102 after the reflection of other objects, such as the reflection of the wall, and, some of which are reflected by the IRS 1031 and then received by the receiver 102. Specifically, in practical applications, multiple IRS s can cooperate to make the signal more stable in the process of transmission. One IRS can further be divided into multiple regions for different tasks, such as optimizing the communication experiences for different users, collaborative optimization for different communication requirements, etc. It should be noted that the IRS in the embodiments of the present disclosure may have a two-dimensional flat structure or a three-dimensional structure. As shown in FIG. 2 which illustrates an exemplary structure of an IRS according to the present disclosure, the IRS may be in the shape of a folded book. It should be noted that the IRS with a complex 3D structure can be directly produced, or a simple IRS can be produced first, and then spliced into a three-dimensional IRS with a complex 3D structure according to a certain angle and structure. When the IRS is a three-dimensional structure, it can significantly enhance the rank of the channel matrix in the multiple-input multiple-output scenario.

The method described in this embodiment can also be applied in indoor scenarios, in addition to outdoor scenarios. Exemplarily, in an indoor scenario, the IRSs 1031 may be placed in various corners or dead corners of a room to change the quality of the received signal at the receiver, reduce the dead angle of the wireless signal, improve the number of bytes of wireless communication transmission, and significantly increase the multipath and reduce the channel correlation in the multi-antenna communication scenario. Therefore, the rank of the multi-input multi-output channel matrix is improved, and the wireless communication experience of indoor users is therefore improved.

The method according to the embodiments of the present disclosure can also be used in a scenario in which the quality of the received signal needs to be decreased. For example, the signals can be canceled out for coherence by encoding, and the signal dead angle can be intentionally created to enhance the security of communication.

Based on the communication system architecture shown in FIG. 1, a detailed description of the phase shift control method of the IRS will be introduced according to the embodiments of the present disclosure. The phase shift control method of the IRS in the embodiments of the present disclosure can be applied to different scenarios, and corresponding implementation steps for different scenarios may be slightly different, which will be described as follows.

I. Single-User Scenario of Single-Input Single-Output (SISO) System

Figure 3:
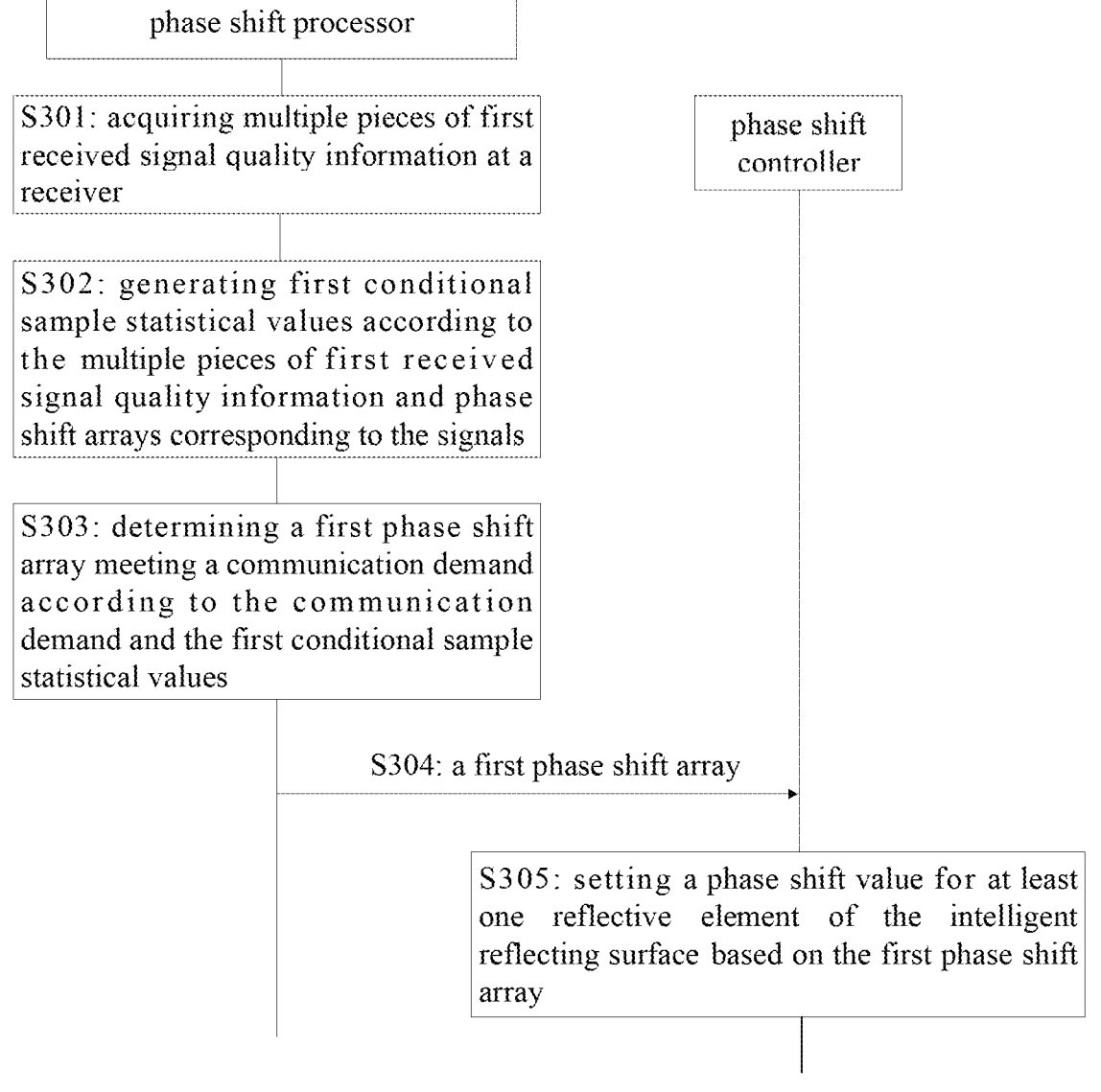
FIG. 3 is a schematic flow chart of a method for controlling phase shifts of an IRS according to an embodiment of the present disclosure.

FIG. 3 is a schematic flow chart of a method for controlling phase shifts of an IRS provided by embodiments of the present disclosure. The method includes the following steps.

S301: A phase shift processor acquires multiple pieces of first received signal quality information at a receiver. The multiple pieces of first received signal quality information represent the qualities of signals received at the receiver, respectively.

Network device sends wireless signals, some of which reach the receiver directly, some of which reach the receiver through the reflection of an IRS, and some of which may reach the receiver through the reflection of other objects.

An implementation for reflecting a wireless signal by the IRS is given as follows.

The phase shift processor generates multiple phase shift arrays online, and each item in each phase shift array defines a phase shift value for one reflective element of a corresponding IRS. For instance, suppose that the phase shift processor generates T phase shift arrays and this IRS consists of N reflective elements. For the t-th phase shift array, the generated phase shift array may be represented by equation (1) as follows:

$$\theta^t = \{\theta^t_1, \dots, \theta^t_n, \dots, \theta^t_N\} \qquad \text{equation (1)}$$

where $$\theta^t_n$$

represents a phase shift state of the n-th reflective element in the t-th phase shift array.

The phase shift processor sends the generated multiple phase shift arrays to the phase shift controller. It should be understood that the phase shift processor may send all phase shift arrays at once or it can also send them one by one, which is not limited here.

The phase shift controller sends the phase shift arrays to the IRS. Every time the phase shift controller sends one phase shift array, the receiver receives a first received signal correspondingly. Therefore, when the IRS uses multiple phase shift arrays, the receiver receives multiple first received signals.

A signal detector detects the first received signals and acquires the multiple pieces of first received signal quality information. The multiple pieces of first received signal quality information represent the qualities of the signals received at the receiver respectively. Specifically, the first received signal quality information may represent an average or a weighted value of the qualities of the multiple first received signals received at the receiver, or represent the quality of one of the first received signals received at the receiver. The first received signal quality information may include at least one of the following: an RSRP, an SINR, a spectral efficiency, a transmission rate, a sum of transmission rates at multiple receivers, a bit error rate, or a time delay.

The signal detector outputs the acquired first received signal quality information to the phase shift processor. Accordingly, the phase shift processor acquires the first received signal quality information.

Exemplarily, during the measurement of the first received signals, the clock of the phase shift controller is kept in synchronization with the clock of the phase shift processor.

During the entire process of measuring the first received signal, the IRS does not need any information interactions with the network devices, and the receiver does not need to make any channel estimation.

S302: The phase shift processor generates the first conditional sample statistical values according to the multiple pieces of first received signal quality information and phase shift arrays corresponding to the signals.

After acquiring the quality information of the first received signal, the phase shift processor generates the first condition sample statistical values according to the quality information of the first received signal and the phase shift array corresponding to the received signal at the receiver.

There are multiple ways for the phase shift processor to acquire the phase shift arrays corresponding to the signals received at the receiver.

In one implementation, the phase shift array codebook is preset in both the phase shift processor and the phase shift controller, and the phase shift array codebook contains multiple phase shift arrays. On the premise of keeping clock synchronization, the phase shift controller selects phase shift arrays sequentially from the phase shift array codebook and sends the chosen phase shift arrays to the IRS, while the phase shift processor synchronously reads phase shift arrays in sequence from the phase shift array codebook for pairing with the first received signal quality information.

In another possible implementation, the preset phase shift array codebook is not required by the phase shift processor and the phase shift controller. The phase shift processor generates multiple phase shift arrays online and sends them to the phase shift controller. Alternatively, the phase shift controller may generate multiple phase shift arrays and send them to the phase shift processor.

The specific method of acquiring multiple phase shift arrays by the phase shift processor is not limited here.

Suppose that the IRS consists of N independent reflective elements, and the phase shift values of the respective reflective elements are from a discrete set, the discrete set can be expressed by the following equation (2):

$$\Phi = \{\phi_1, \dots, \phi_k, \dots, \phi_K\}, \phi_k = \frac{2(k-1)\pi}{K} \qquad \text{equation (2)}$$

where K is the number of phase shift values for the respective reflective elements to select.

Each first conditional sample statistical value represents the average value of the first received signal qualities, estimated from random samples when the phase shift of a single reflective element is fixed at a specific value while the phase shift values for the remaining reflective elements are randomly selected. According to the first received signal quality information and the corresponding beamforming codes (i.e., the phase shift array corresponding to the signal), the first conditional sample statistical value for the n-th reflective element with the phase shift value $\theta_n$ equal to $\phi_k$ is calculated by equation (3):

$$J_{n,k} = \hat{\mathbb{E}}\,[y\,|\,\theta_n = \phi_k] = \frac{1}{|Q_{nk}|}\sum\nolimits_{t \in Q_{nk}} y_t(\theta^t) \qquad \text{equation (3)}$$

where $y_t$ represents the t-th measured sample data (i.e., the first received signal quality information), $\theta^t$ represents the phase shift array corresponding to the t-th measured sample data, $Q_{nk}$ represents the measured sample subset that meets $\theta_n = \phi_k$. For N reflective elements, each reflective element has K phase shift values to be chosen, and therefore, N*K first conditional sample statistical values can be acquired at the end.

Specifically, the determination of the conditional sample statistical values includes:
  selecting any one of the reflective elements, fixing the phase shift of the selected reflective element at one of preset phase shift values;
  acquiring a set of quality information received at the receiver corresponding to the fixed preset phase shift value, each quality information of which is acquired when the different combinations of phase shifts are randomly used for the remaining reflective elements;

with respect to each fixed preset phase shift value, acquiring the average of the set of quality information as the conditional sample statistic value for the selected reflective element;

traversing the remaining preset phase shift values of the selected reflective element to acquire a set of statistic values for the selected reflective element; and traversing the remaining reflective elements to acquire respective sets of statistic values to determine the first conditional sample statistic values for all the remaining reflective elements.

An example of calculating the first conditional sample statistical values is provided as follows.

In the case where N=3, K=2, T=6, the IRS has three reflective elements, and each reflective element has two phase shift values to be chosen, i.e., 0 and $\pi$. The measured sample set thus includes six sets of samples. An example of the measured sample set and sample data set is shown in Table I.

TABLE I

| t | 1 | 2 | 3 | 4 | 5 | 6 |
|---|---|---|---|---|---|---|
| $\theta^t = \{\theta_1^t, \ldots, \theta_N^t\}$ | $\{0, 0, \pi\}$ | $(\pi, 0, 0)$ | $\{0, \pi, \pi\}$ | $\{\pi, 0, \pi\}$ | $\{\pi, \pi, \pi\}$ | $\{0, \pi, 0\}$ |
| $y^t$ | 5 | 2 | 6 | 4 | 9 | 7 |

$J_{1,1} = \hat{\mathbb{E}}[y|\theta_1=0]$ is calculated according to the above equation (3), where samples that meets $\theta_1=0$ include sample 1, sample 3 and sample 6, i.e., $Q_{1,1}=\{y^1, y^3, y^6\}$. $J_{1,1}$ can be thus acquired:

$$J_{1,1}=\frac{1}{3}(y^1+y^3+y^6)=6$$

Similarly, the first conditional sample statistical values of the three reflective elements may be calculated as shown in Table II.

TABLE II

| $J_{n,k}$ | $\theta_1$ | $\theta_2$ | $\theta_3$ |
|---|---|---|---|
| 0 | $\frac{1}{3}(y_1 + y_3 + y_6) = 6$ | $\frac{1}{3}(y_1 + y_2 + y_4) = \frac{11}{3}$ | $\frac{1}{2}(y_2 + y_6) = \frac{9}{2}$ |
| $\pi$ | $\frac{1}{3}(y_2 + y_4 + y_5) = 5$ | $\frac{1}{3}(y_3 + y_5 + y_6) = \frac{22}{3}$ | $\frac{1}{4}(y_1 + y_3 + y_4 + y_5) = 6$ |

In addition, consider a scenario where multiple blocks of IRSs cooperate with each other. The total number of reflective elements of L IRSs is $$N = \sum_{l=1}^{L} N_l,$$

where $N_l$ represents the number of reflective elements of the l-th IRS.

All the L reflecting surfaces perform sampling at the same time and share one data set, that is, according to a sample data set $\{y_1, \ldots, y_t, \ldots, y_T\}$ and a corresponding phase shift array $\{\theta^1, \ldots, \theta^t, \ldots, \theta^T\}$, N*K first conditional sample statistics $J_{n,k}$ are calculated. T is the size of the detected sample set, and $$\theta^t = \{\theta_1^t, \ldots, \theta_l^t, \ldots, \theta_L^t\}$$

is an N-dimensional vector concatenated by L component vectors $$\theta_l^t = \{\theta_{l,1}^t, \ldots, \theta_{l,N_l}^t\}, l = 1, \ldots, L.$$

Each component vector independently corresponds to phase shift values of respective reflective elements of one IRS. Here, $\theta^t$ may be abbreviated as $$\theta^t = \{\theta_1^t, \ldots, \theta_N^t\}.$$

S303: The phase shift processor determines the first phase shift array that meets the communication requirement according to the first conditional sample statistical values, where the first phase shift array includes a phase shift value for at least one reflective element of the IRS.

The phase shift processor can determine the first shift array that meets a communication requirement according to a specific communication requirement and the first conditional sample statistical values.

The communication requirement may include enhancing signal quality at the receiver or decreasing signal quality at the receiver. Therefore, according to different communication requirements, specific implementations of step S303 may be different.

(1) the Communication Requirement is to Enhance Signal Quality at the Receiver.

A scenario of enhancing the signal quality at the receiver could be, for example, placing IRSs in various corners or dead corners of a room to reduce the dead corners of the wireless signal and increase the number of bytes during the wireless communication transmission, and enhance the signal quality at the receiver. In the multi-antenna communication scenario, multipath could be significantly increased, and channel correlation could be reduced, thereby improving the rank of a channel matrix of multi-input multi-output communication scenario, and improving the wireless communication experience for indoor users.

An implementation of solving the first phase shift array that meets the communication requirement of enhancing the signal quality at the receiver might include but is not limited to the following implementations A1 and A2.

In implementation A1, step S303 could include acquiring a phase shift value based on the maximum value out of first conditional sample statistical values for each reflective element, and forming a first phase shift array based on the acquired phase shift values.

That is, for the n-th reflective element, a phase shift value based on the maximum value out of K first conditional sample statistical values is selected as a solution:

$$\theta_n^{CSM} = \underset{\phi_k \in \Phi}{\mathrm{argmax}} \, \hat{\mathbb{E}} \left[ y \mid \theta_n = \phi_k \right]$$

where $$\theta_n^{CSM}$$

is the final selected phase shift value of the n-th reflective element. The final determined code is denoted as $\theta^{CSM}$.

Similarly, the phase shift value based on the maximum value out of the first conditional sample statistical values for each of the N reflective elements is acquired, and the first shift phase array is formed by multiple acquired phase shift values.

In another implementation A2, step S303 might include determining the first phase shift array based on at least two first alternative phase shift arrays.

Specifically, determining the first phase shift array based on at least two first alternative phase shift arrays includes the following steps:

A21: determining at least two first alternative phase shift arrays;

A22: acquiring multiple pieces of second received signal quality information which represent qualities of received signals respectively corresponding to the first alternative phase shift arrays;

A23: generating second conditional sample statistical values based on the multiple pieces of second received signal quality information and the first alternative phase shift arrays;

A24: choosing the first alternative phase shift array that corresponds to the maximum value out of the second conditional sample statistical values as the first phase shift array.

That is, for each reflective element, at least two first alternative phase shift arrays are determined first and denoted as $\vartheta^\nu$. The phase shift controller sends the at least two first alternative phase shift arrays to the IRS. The IRS reflects a signal transmitted from a transmitting end based on each first alternative phase shift array. The signal detector detects signals received at the receiver, acquires second received signal quality information, and sends them to the phase shift processor. Each second received signal quality information represents the quality of a signal received at the receiver based on the corresponding first alternative phase shift array. The phase shift processor generates second conditional sample statistical values based on the multiple pieces of second received signal quality information and the corresponding first alternative phase shift arrays. For the specific implementation, reference can be made to the step S302. Finally, the phase shift processor chooses the first alternative phase shift array that corresponds to the maximum value out of the second conditional sample statistical values as the first phase shift array, denoted as $\theta^{ECSM}$.

$$\theta^{ECSM} = \underset{\vartheta}{\mathrm{argmax}} \left\{ y\left(\vartheta^1\right), \ldots, y\left(\vartheta^\nu\right), \ldots \right\}$$

The determination of the first phase shift array based on the at least two first alternative arrays will be described as follows.

Figure 4:
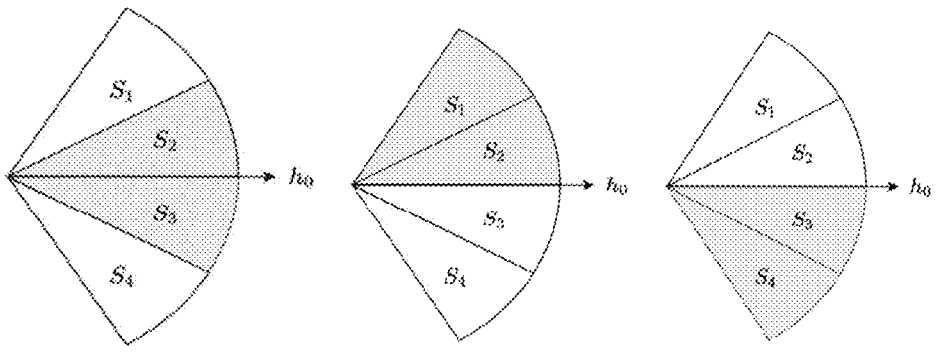
FIG. 4 is a schematic diagram illustrating a determination of a first phase shift array according to an embodiment of the present disclosure.

The first conditional sample statistical values are used to solve for the n-th reflective element. FIG. 4 is a schematic diagram illustrating the determination of a first phase shift array according to an embodiment of the present disclosure. Four sectors $S_1$, $S_2$, $S_3$ and $S_4$ each with a central angle of $\pi/K$ are defined here. A direct channel $h_0$ is taken as a vector which takes the origin in a two-dimensional plane as the start point. Without loss of generality, assuming that $h_0$ is located in the direction of an x-axis, then $S_1$ is a sector region with an angle from $\pi/K$ to $$\frac{2\pi}{K},$$

$S_2$ is a sector region with an angle from 0 to $\pi/K$, $S_3$ is a sector region with an angle from 0 to $$-\frac{\pi}{K},$$

and $S_4$ is a sector region with an angle from $$-\frac{\pi}{K} \text{ to } -\frac{2\pi}{K}.$$

For each reflective element, the phase shift value that maximizes the first conditional sample statistical values over K phase shift options will be chosen as the optimized solution (case 1), which is equivalent to rotating all the reflection channels to sectors S2 and S3. However, this may not be the optimal solution. The other two alternative solutions are rotating all the reflection channels to sector S1 and S2 (case 2), and rotating all the reflection channels to sector S3 and S4 (case 3), respectively.

The method for determining the first alternative phase shift array is as follows:

The values of $$\hat{\mathbb{E}} \left( y \mid \theta_n = \theta_n^{CSM} + \frac{2\pi}{K} \right) \text{ and } \hat{\mathbb{E}} \left( y \mid \theta_n = \theta_n^{CSM} - \frac{2\pi}{K} \right)$$

is compared;

If $$\hat{\mathbb{E}} \left( y \mid \theta_n = \theta_n^{CSM} + \frac{2\pi}{K} \right) < \hat{\mathbb{E}} \left( y \mid \theta_n = \theta_n^{CSM} - \frac{2\pi}{K} \right),$$

it means that the channel $$h_n e^{j\theta_n^{CSM}}$$

is located in sector $S_2$. Then the phase shift value corresponding to case 2 is $$\vartheta_n^1 = \theta_n^{CSM},$$

and $$\vartheta_n^2 = \theta_n^{CSM} - \frac{2\pi}{K}$$

is the phase shift value corresponding to case 3; a

If $$\hat{\mathbb{E}}\left(y \mid \theta_n = \theta_n^{CSM} + \frac{2\pi}{K}\right) > \hat{\mathbb{E}}\left(y \mid \theta_n = \theta_n^{CSM} - \frac{2\pi}{K}\right),$$

it means that the channel $$h_n e^{j\theta_n^{CSM}}$$

is located in $S_3$. Then the phase shift value corresponding to case 2 is $$\vartheta_n^1 = \theta_n^{CSM} + \frac{2\pi}{K},$$

and $$\vartheta_n^2 = \theta_n^{CSM}$$

is the phase shift value corresponding to case 3.

Then, the phase shift controller sends the first alternative phase shift arrays corresponding to case1, case2, and case3 to the IRS. The IRS then reflects the wireless signal sent by a particular transmitter based on each first alternative phase shift array. The signal detector detects signals received by the receiver, acquires the second received signal quality information, and then sends this information to the phase shift processor. The phase shift processor then generates second conditional sample statistical values based on the multiple pieces of second received signal quality information and the corresponding first alternative phase shift array. Finally, the phase shift processor acquires the first alternative phase shift array that maximizes the value of the second conditional sample statistical values and makes it the optimal solution.

(2) the Communication Requirement is to Decrease the Signal Quality at the Receiver.

In scenarios where the communication requirement is to decrease the signal quality at the receiver, for instance, in communication scenarios involving counteracting malicious interference (anti-jamming) As an example, when the signal received by the receiver (Bob) from the transmitter (Alice) is susceptible to interference from a malicious entity (Eve), utilizing the algorithm proposed in this embodiment based on IRSs can effectively mitigate the interference caused by Eve to the receiver (Bob) without requiring knowledge of the channel between Eve and Bob. Moreover, it can also be used to mitigate the interference from neighboring cell base stations on the communication of the serving cell for the user, transforming it from merely creating communication blind spots.

In an algorithm that weaken the signals, the goal is to rotate all the reflection channels $h_n$ to the opposite direction of $h_0$. This is reasonable when $$\sum_{n=1}^{N} |h_n|$$

is smaller than $|h_0|$. But when $$\sum_{n=1}^{N} |h_n|$$

is greater than $|h_0|$, it requires rotating a portion of reflection channels $h_n$ to the same direction as $h_0$, while rotating another portion of reflection channels to the opposite direction of $h_0$. Different cases are explained below.

1.

$$\sum_{n=1}^{N} |h_n|$$

is smaller than $|h_0|$, the first phase shift array can be determined by two different implementations (A3 and A4).

In implementation A3, step S303 includes acquiring the phase shift value based on the minimum values of the first conditional sample statistical values for each reflective element and then forming the first phase shift array based on the acquired phase shift values.

That is, for each reflective element, the phase shift value that minimizes the first conditional sample statistical values over total K phase shift options will be chosen as the solution.

$$\theta_n^{CSM} = \underset{\phi_k \in \Phi}{\arg\min} \, \hat{\mathbb{E}} \, [y \mid \theta_n = \phi_k]$$

where $$\theta_n^{CSM}$$

is the final phase shift value for the n-th reflective element, and the final code is denoted as $\theta^{CSM}$.

Similarly, if there are a total of N reflective elements, the first phase shift array can be acquired by choosing a phase shift value for each reflective element that minimizes the first conditional sample statistical values over a total of K phase shift options.

In another implementation, A4, step S303 includes determining the first phase shift array based on at least two second alternative phase shift arrays.

Specifically, determining the first phase shift array based on at least two second alternative phase shift arrays includes:

A41: determining at least two second alternative phase shift arrays;

A42: acquiring multiple pieces of third received signal quality information which represent qualities of the received signals respectively corresponding to the second alternative phase shift arrays;

A43: generating the third conditional sample statistical values based on the multiple pieces of third received signal quality information and the corresponding second alternative phase shift arrays;

A44: acquiring the second alternative phase shift array that minimizes the third conditional sample statistical values, and let it be the first phase shift array.

That is, for each reflective element, at least two second alternative phase shift arrays should be determined, and denoted by $\vartheta^v$. The phase shift controller sends the at least two second alternative phase shift arrays to the IRS. The IRS reflects the signals sent by the transmitter based on each second alternative phase shift array. The signal detector detects the signals received by the receiver and acquires third received signal quality information which represent the received signal qualities at the receiver based on the corresponding second alternative phase shift arrays. The signal detector then sends them to the phase shift processor. The phase shift processor then generates third conditional sample statistical values based on multiple pieces of third received signal quality information and the corresponding second alternative phase shift arrays. For precise implementation details, please refer to step S302. Finally, the phase shift processor acquires the second alternative phase shift array that minimizes the value of the third conditional sample statistical values and makes it the first phase shift array, which is denoted as $\theta^{ECSM}$, i.e., $$\theta^{ECSM} = \underset{\vartheta}{\operatorname{argmin}}\{y(\vartheta^1), \ldots, y(\vartheta^v), \ldots\}$$

The determination of the first phase shift array based on at least two second alternative phase shift arrays is similar to the determination of the first phase shift array to enhance signal quality at the receiver. The distinction lies in rotating all reflection channels to a sector that is opposite to $h_0$.

Figure 5:
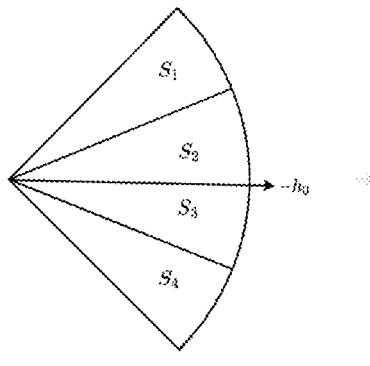
FIG. 5 is a schematic diagram illustrating another determination of a first phase array according to an embodiment of the present disclosure.

As shown in FIG. 5 which is a schematic diagram that illustrates another way of determining the first phase shift array according to the embodiments of this disclosure, the determination of the first phase shift array is as follows:

The values of $$\hat{\mathbb{E}}\left(y \mid \theta_n = \theta_n^{CSM} + \frac{2\pi}{K}\right)$$

and $$\hat{\mathbb{E}}\left(y \mid \theta_n = \theta_n^{CSM} - \frac{2\pi}{K}\right)$$

is compared;

If $$\hat{\mathbb{E}}\left(y \mid \theta_n = \theta_n^{CSM} + \frac{2\pi}{K}\right) > \hat{\mathbb{E}}\left(y \mid \theta_n = \theta_n^{CSM} - \frac{2\pi}{K}\right),$$

it means that the channel $$h_n e^{j\theta_n^{CSM}}$$

is located in sector $S_2$. Then the phase shift value corresponding to case 2 is $$\vartheta_n^1 = \theta_n^{CSM},$$

and $$\vartheta_n^1 = \theta_n^{CSM} - \frac{2\pi}{K}$$

is the phase shift value corresponding to case 3; and If $$\hat{\mathbb{E}}\left(y \mid \theta_n = \theta_n^{CSM} + \frac{2\pi}{K}\right) < \hat{\mathbb{E}}\left(y \mid \theta_n = \theta_n^{CSM} - \frac{2\pi}{K}\right),$$

it means that the channel $$h_n e^{j\theta_n^{CSM}}$$

is located in $S_3$. Then the phase shift value corresponding to case 2 is $$\vartheta_n^1 = \theta_n^{CSM} + \frac{2\pi}{K},$$

and $$\vartheta_n^2 = \theta_n^{CSM}$$

is the phase shift value corresponding to case 3.

Then, the phase shift controller sends the second alternative phase shift arrays corresponding to case1, case2, and case3 to the IRS. The IRS then reflects the wireless signal sent by a particular transmitter based on each second alternative phase shift array. The signal detector detects signals received by the receiver, acquires the third received signal quality information, and then sends this information to the phase shift processor. The phase shift processor then generates third conditional sample statistical values based on the third received signal quality information and the corresponding second alternative phase shift arrays. Finally, the phase shift processor acquires the second alternative phase shift array that minimizes the value of the third conditional sample statistical values as the first phase shift and makes it the optimal solution.

2. When $$\sum_{n=1}^{N} |h_n|$$

is greater than $|h_0|$, the algorithm is as follows:

Now, a certain proportion of the reflection channels need to be rotated to the same direction as $h_0$, while others are rotated to the opposite direction of $h_0$.

In another implementation, A5, the IRS includes N reflective elements, and the first phase shift array includes a first phase shift sub-array and a second phase shift sub-array. The first phase shift sub-array includes phase shift values of $\lfloor Nx \rfloor$ reflective elements of the IRS, and the second phase shift sub-array includes phase shift values of $N-\lfloor Nx \rfloor$ reflective elements of the IRS, where $0<x<1$.

The step S303 then includes:

acquiring the phase shift value based on the minimum value out of the first conditional sample statistical values for each of the $\lfloor Nx \rfloor$ reflective elements of the IRS, and forming the first phase shift sub-array based on the acquired phase shift values; and acquiring the phase shift value based on the minimum value out of the first conditional sample statistical values for each of the $N-\lfloor Nx \rfloor$ reflective elements of the IRS, and forming the second phase shift sub-array based on the acquired phase shift values.

Specifically, 1. Assuming the strength of all reflection channels, denoted as $\beta_n$, are equal, i.e., $\beta_n=\beta$, and the phase shift value of each reflective element can be continuously chosen. Then $\beta_0+xN\beta=(1-x)N\beta$, and it can be calculated that $$x = \frac{1/2(N\beta - \beta_0)}{N\beta} = \frac{\gamma - 1}{2\gamma},$$

where $$\gamma = \frac{N\beta}{\beta_0}.$$

2. Assuming the phase shift value corresponding to the minimum value out of K first conditional sample statistical values are selected as the phase shift value for each reflective element, multiple detections are performed on transmitted signals at the receiver, each with a detection result of $f_1$, where $$\hat{E}(f_1)=(\beta_0+N\beta)^2+\sigma^2.$$

3. Assuming the phase shift value corresponding to the maximum value out of K first conditional sample statistical values are selected as the phase shift value for each reflective element, multiple detections are performed on transmitted signals at the receiver, each with a detection result of $f_2$, where $$\hat{E}(f_2)=(\beta_0-N\beta)^2+\sigma^2.$$

4. Assuming the phase shift value of each of a certain proportion of reflective elements based on the maximum value out of K first conditional sample statistical values is selected as the phase shift value for the reflective element, and the phase shift of each of a certain proportion of reflective elements based on the minimum value out of K first conditional sample statistical values is selected as a phase shift value for the reflective element. Detections are performed on transmitted signals at the receiver, each with a detection result of $f_0$, where $$\hat{E}(f_0)=(\beta_0)^2+\sigma^2.$$

5. Finally the following equations are acquired:

$$\gamma = 4\frac{\hat{E}(f_1)-\hat{E}(f_0)}{\hat{E}(f_1)-\hat{E}(f_2)}-2$$

-continued $$x = \frac{\gamma-1}{2\gamma}$$

Further, the IRS control system may pre-store multiple phase shift control schemes or phase shift array modes. Each scheme corresponds to one application, e.g., increasing or decreasing coverage areas for the target regions, mitigating interference, and increasing the transmission rate. Users may select phase shift control schemes or phase shift array modes of the IRS through wireless control instructions according to their requirements. Specifically, the method may further include:

the phase shift processor receives a set of phase shift array modes, where the set of phase shift array modes consists of at least one of phase shift array modes from the above-described implementations A1~A5;

the phase shift processor stores at least one correspondence between a phase shift array mode label and a phase shift array mode;

the phase shift processor receives a selecting instruction from a user, where the selecting instruction includes a first phase shift array mode label;

the phase shift processor selects a phase shift array mode according to the first phase shift array mode label and the correspondence.

S304: The phase shift processor sends the first phase shift array, and the phase shift controller receives the first phase shift array accordingly.

After determining the first phase shift array, the phase shift processor sends the first phase shift array to the phase shift controller.

It should be understood that in practical applications, the phase shift processor may send the first phase shift array including phase shift values of a part of reflective elements to the phase shift controller after determining the phase shift values of the part of reflective elements, or the phase shift processor may send the first phase shift array including phase shift values of all reflective elements to the phase shift controller after determining the phase shift values of all reflective elements, which is not specifically limited here.

S305: The phase shift controller sets the phase shift value for at least one reflective element of the IRS based on the first phase shift array.

The phase shift controller is used to control the beamforming of the IRS. The phase shift controller sets the phase shift value of at least one reflective element of the IRS based on the first phase shift array received from the phase shift processor.

Exemplarily, after receiving the first phase shift array, the phase shift controller sets phase shift values for reflective elements of the IRS according to the first phase shift array.

Exemplarily, if the first phase shift array received by the phase shift controller includes optimized phase shift values for only a part of reflective elements, phase shift values for this part of reflective elements of the IRS are set accordingly.

According to the method for controlling phase shifts of an IRS according to embodiments of this disclosure, a first phase shift array that meets a communication requirement is determined based on the communication requirement and the first conditional sample statistical values. The first phase shift array is sent to set the phase shift values for the IRS, such that the signal quality received at the receiver may be flexibly changed according to the communication requirement.

In this embodiment, the method adopts an optimization idea based on sample analysis. There is no need for the IRS to exchange any information with other network devices, and there is no need for the receiver to make any channel estimation, thereby addressing the issue of deep reliance on fully known channel information in the optimization of the IRS. By utilizing a statistical method to solve the high-dimensional discrete non-convex optimization problem (i.e., beamforming encoding) with linear time complexity, near-optimal solutions can be acquired, even with limited sampling.

It should be understood that in practical applications, the phase shift processor may send a first phase shift array including phase shift values of a part of reflective elements to the phase shift controller after determining the phase shift values of those reflective elements. The phase shift processor may also send a first shift array including shift values of all reflective elements to the phase shift controller after determining the phase shift values of all reflective elements.

Figure 6:
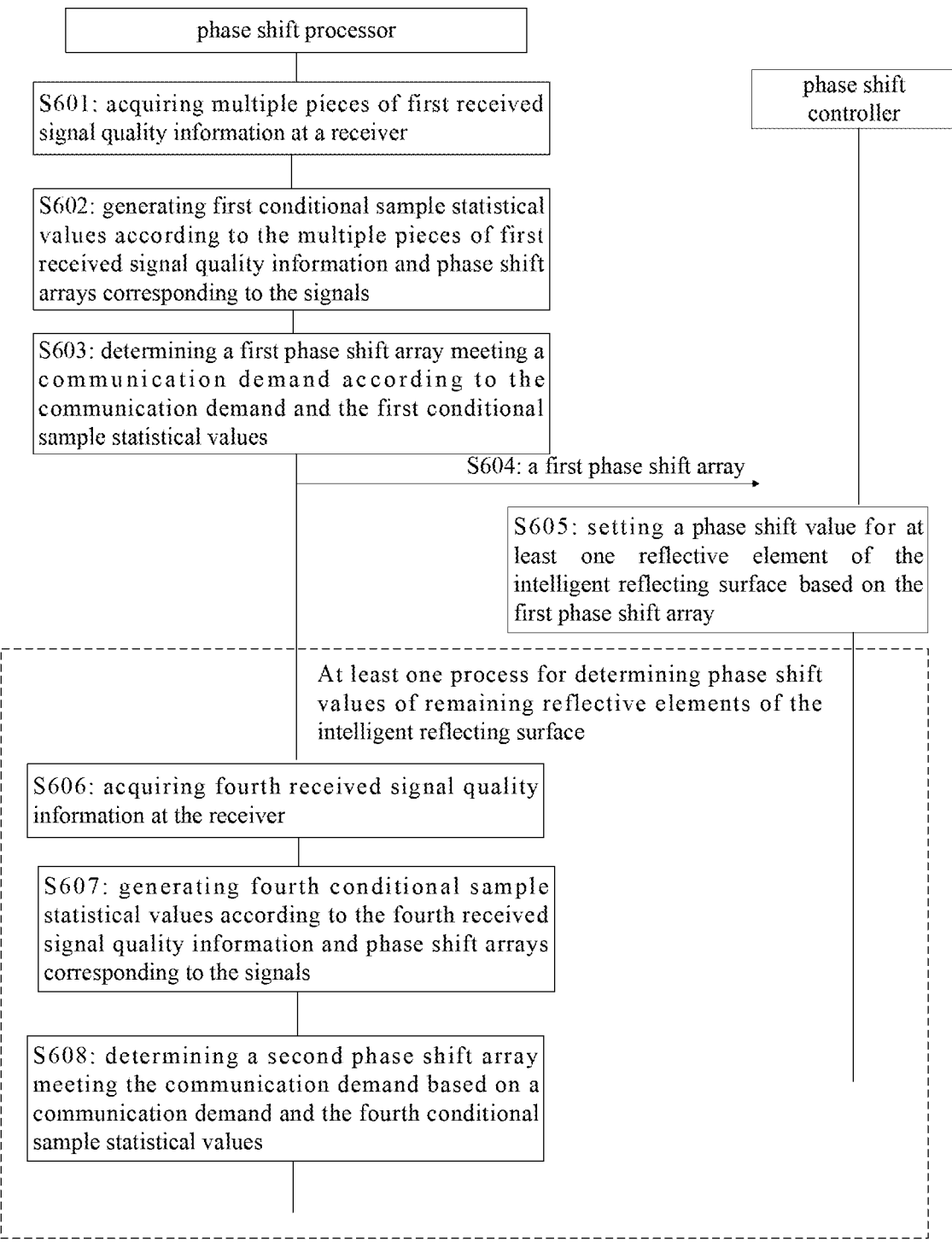
FIG. 6 is a schematic flow chart of another method for controlling phase shifts of an IRS according to an embodiment of the present disclosure.

As shown in FIG. 6 which is a schematic flow chart of another method for controlling phase shifts of an IRS provided by an embodiment of this disclosure, the IRS consists of N reflective elements, where N is a positive integer. The method may include the following steps.

S601: A phase shift processor acquires the multiple pieces of first received signal quality information at the receiver, where the multiple pieces of first received signal quality information represent the quality of signals received at the receiver.

S602: The phase shift processor generates the first conditional sample statistical values according to the multiple pieces of first received signal quality information and the corresponding phase shift arrays.

S603: The phase shift controller determines the first phase shift array based on the communication requirement and the first conditional sample statistical values.

In this embodiment, the first phase shift array includes the phase shift value(s) of $Y_1$ reflective elements of the IRS, where $1 \leq Y_1 \leq N$, and $Y_1$ is a positive integer.

S604: The phase shift processor sends the first phase shift array and the phase shift controller receives the first phase shift array accordingly.

Different from the embodiment shown in FIG. 3, in this embodiment, the first phase shift array includes optimized phase shift values of a part of reflective elements of the IRS.

S605: The phase shift controller sets the phase shift value for at least one reflective element of the IRS according to the first phase shift array.

The first phase shift array in this embodiment includes optimized phase shift values of a part of reflective elements in the IRS. Accordingly, the phase shift controller generates corresponding random samples for remaining reflective elements for which optimized phase shift values are not yet determined, and sends these random samples to the IRS as the phase shift values of the remaining reflective elements.

The method may further include at least one process, in which phase shift values of the remaining reflective elements of the IRS are determined until the phase shift values of the N reflective elements that meet the communication requirement are determined. Each process that determines the phase shift values of the remaining reflective elements of the IRS includes the following steps S606~S608.

S606: The phase shift controller acquires fourth received signal quality information at the receiver which represent the quality of signals received at the receiver when phase shift values of $Y_1$ reflective elements of the IRS are determined but phase shift values of $N-Y_1$ reflective elements are not yet determined.

The phase shift values of the $N-Y_1$ reflective elements are not yet determined, so that the phase shift values of the $N-Y_1$ reflective elements will be randomly selected when collecting the fourth received signal quality information.

The implementation of S606 is specified in step S301.

S607: The phase shift processor generates fourth conditional sample statistical values according to the fourth received signal quality information and the corresponding phase shift arrays.

The implementation of S607 is specified in step S302.

S608: The phase shift processor determines the second phase shift array based on the communication requirement and the fourth conditional sample statistical values. The second phase array includes a phase shift value(s) of $Y_2$ reflective elements of the IRS, where $1 \leq Y_2 \leq N-Y_1$, and $Y_2$ is a positive integer.

The implementation of S608 is specified in step S303.

For the above-described S606~S608, specifically, in a scenario with the communication requirement of enhancing received signal quality, and for the m-th iteration, based on the collected data ($T_m$ sets of $N_m$-dimensional samples), conditional sample statistical values $J^m$ for all reflective elements each under different phase shift values are calculated. For an individual reflective element n, the phase shift value based on the maximum first conditional sample statistical values is selected as a temporary solution of the current reflective element, i.e., $$\theta_n^m = \underset{\phi_k \in \Phi}{\mathrm{argmax}}\, J_{n,k}^m$$

Selecting a part of reflective elements $\theta_n$ among all reflective elements, where $n \in \aleph_m$, the solutions of the reflective elements $\theta_n$ are fixed at $\theta_n^* = \theta_n^m$, where $\aleph$ represents a set of reflective elements that need to be fixed.

The fixed phase shifts of the reflective elements are provided to the detection module through interaction. The detection module continues to generate $T_{m+1}$ sets of $(N_m-|\aleph_m|)$-dimensional samples for the remaining undetermined reflective elements based on the current result, and $N_{m+1}$ is updated as $N_{m+1}=N_m-|\aleph_m|$.

End this round of interaction.

For a scenario where the communication requirement is to decrease the received signal quality, during the process of data collection, a part of the data is transmitted to the phase shift processor. The phase shift processor outputs an initial phase shift optimization suggestion and sends it to the phase shift control module of the IRS. The phase shift control module instructs a way of updating phase shift array for the IRS, and collects data at the same time, thereby realizing a process of learning and optimizing concurrently.

The core of the algorithm in this section is still the first conditional sample statistical values and what is different from the previous one is the specific steps for solving the algorithm. The goal of this algorithm is to realize that a part of the reflection channel is used to offset direct channel strength while the remaining reflection channel is used to offset with each other, thereby achieving an effect of reducing signal quality at the receiver.

The entire algorithm is formed by parameter computation and M times of data transfer between the detection module and the phase shift controller. The steps of the parameter computation include steps:

calculating the difference between the expected channel quality and the theoretical value of the first conditional sample statistical value;

calculating the difference between the expected channel quality and the estimated value of the first conditional sample statistical value;

acquiring an estimation of a ratio $\rho$ of the direct channel quality to the reflection channel quality by minimizing the difference between the expected channel quality and the theoretical value of the first conditional sample statistical value and the difference between the expected channel quality and the estimated value of the first conditional sample statistical value, thereby completing the parameter computation.

The specific algorithm steps for the m-th interaction are as follows:

Step (a): Conditional sample statistical values $J^m$ of all reflective elements under different phase shift values are calculated based on the collected data ($T_m$ sets of $N_m$-dimensional samples). For the n-th reflective element, the phase shift that minimizes the first conditional sample statistical values corresponding over K selectable phase shift values is selected as a temporary solution for this reflective element, i.e., $$\theta_n^m = \underset{\phi_k \in \Phi}{\arg\max}\, J_{n,k}^m.$$

Step (b): $\gamma(\rho)$ reflective elements $\theta_n$ are selected from all reflective elements, where $n \in \aleph_m$. The solutions of these reflective elements $\theta_n$ are fixed as $\theta_n{}^* = \theta_n{}^m$. Here $\aleph$ represents the set of reflective elements that need to be fixed.

Step (c): The fixed phase shifts of the reflective elements are sent to the detection module. The detection module continues to generate $T_{m+1}$ sets of $N_m$-$|\aleph_m|$-dimensional samples for the remaining unsolved reflective elements based on the current result and $N_{m+1}$ is updated according to $N_{m+1} = N_m - |\aleph_m|$.

Step (d): End this round of interaction.

Exemplarily, in practical applications, for the remaining reflective elements with undetermined phase shift values, only a part of the phase shift values of these reflective elements may be determined each time, which means S606~S608 may need to be repeatedly performed multiple times until phase shift values of all reflective elements of the IRS are determined. It may also perform steps S606~S608 only once to determine phase shift values of all remaining reflective elements of the IRS. Specifics are determined based on practical needs, which are not limited by the present disclosure.

According to the method for controlling phase shifts of an IRS provided by an embodiment of this disclosure, a first phase shift array based on the communication requirement and the conditional sample statistical values is determined, and then sent to set phase shift values for the IRS, such that the quality of the signal received at a receiver can be flexibly changed according to the communication requirement.

II. Single-User Scenario of Multiple-Input Multiple-Output (MIMO) System

What is different from the above-described embodiments is that, in this scenario, the first received signal quality information as described above is a piece of multi-dimensional signal quality information. The multi-dimensional signal quality information represents signal quality at the receiver in a multi-antenna scenario.

The sampling object $y_t$ can be any physical quantity that represents the multi-antenna communication quality, such as spectral efficiency or transmission rate at the receiver.

III. Multi-User Scenario of SISO System

Different from the above embodiments, in this scenario, the phase shift processor acquires multiple pieces of first received signal quality information of multiple receivers. The multiple pieces of first received signal quality information represent the signal qualities of multiple receivers.

In the multi-user scenario, there can be multiple receivers corresponding to the multiple received signal quality information. In the multi-user scenario, it may be necessary to enhance the communication performance of the receiver with the worst or poor signal quality. For the scenario in which the objective is to enhance the communication performance, the first received signal selected from received signals of multiple receivers should meet the following condition:

$$y^t(\theta^t) = \min\{y_1^t(\theta^t), \dots, y_U^t(\theta^t)\}$$

where t represents the t-th detection, and U is the number of receivers.

It means that if the enhancement to the communication performance of multiple receivers is needed, it will select the worst (or relatively worse) signal from the received signals of multiple receivers as the first received signal quality information.

For the scenario of enhanced received signal qualities, the enhanced signal quality of the receiver is equivalent to solving a maximum value problem, that is, to improve the communication experience of the user with the worst communication experience among the multiple receivers as much as possible. The measurements of U users' received signal qualities corresponding to the t-th group of beamforming codes, $y_t$ is defined to meet the following condition:

$$y_t = \min\{y_t^1, \dots, y_t^u, \dots, y_t^U\}$$

where the t-th sampling $y_t$ is the minimum value out of received signal qualities of U receivers.

Then, the operation which is similar to the SISO scenario with signal enhancement is performed.

For the scenario of decreasing received signal qualities, decreasing the signal quality of the receiver is equivalent to solving the minimum value problem, that is, reducing the strongest signal of multiple receivers as much as possible. The measurements of U users' received signal qualities corresponding to the t-th group of beamforming codes, $y_t$ is defined to meet the following condition:

$$y_t = \max\{y_t^1, \dots, y_t^u, \dots, y_t^U\}$$

where the t-th sampling $y_t$ is the maximum value out of received signal qualities of U receivers.

Then, the operation which is similar to the SISO scenario with signal mitigation is performed.

IV. Multi-User Scenario of MIMO System

Different from the above embodiments, in this scenario, the phase shift processor acquires multiple pieces of first received signal quality information of multiple receivers. The multiple pieces of first received signal quality information represent the signal qualities of multiple receivers. The received signal quality information is a piece of multi-dimensional signal quality information. The multi-dimensional signal quality information characterizes the communication performance of receivers in a MIMO scenario.

The sampling object $y_t$ can be many physical quantities that characterize the performance of MIMO communication, such as spectrum efficiency, data rate, and so on.

With the above description of the solutions provided by this scheme, understandably, to achieve the above functions, the phase shift control device of IRS (for example, phase shift processor or phase shift controller which has been described above) includes a hardware structure and/or a software module corresponding to the execution of the various functions. The professionals in this field should be readily aware that the application can be implemented in the form of hardware or a combination of hardware and computer software in combination with the units and algorithmic steps of each example described in the embodiment. Whether a certain function is performed in hardware or computer software drives the hardware depends on the specific application and design constraints of the technical solution. Professionals may adopt different methods to implement the described functions for each particular application, but such implementation shall not be considered beyond the scope of this application.

The embodiment of this application can divide the functional modules of the phase shift control device of IRS according to the above instance, for example, each function module can be divided according to each function, and two or more functions can also be integrated into a processing module. The above functional modules can be implemented either in the form of hardware or in the form of software functional modules. It should be noted that the division of modules in the embodiment is schematic and only a logical function division, and there can be other division ways in the actual implementation. The following is an example of using the corresponding function to divide each function module.

Figure 7:
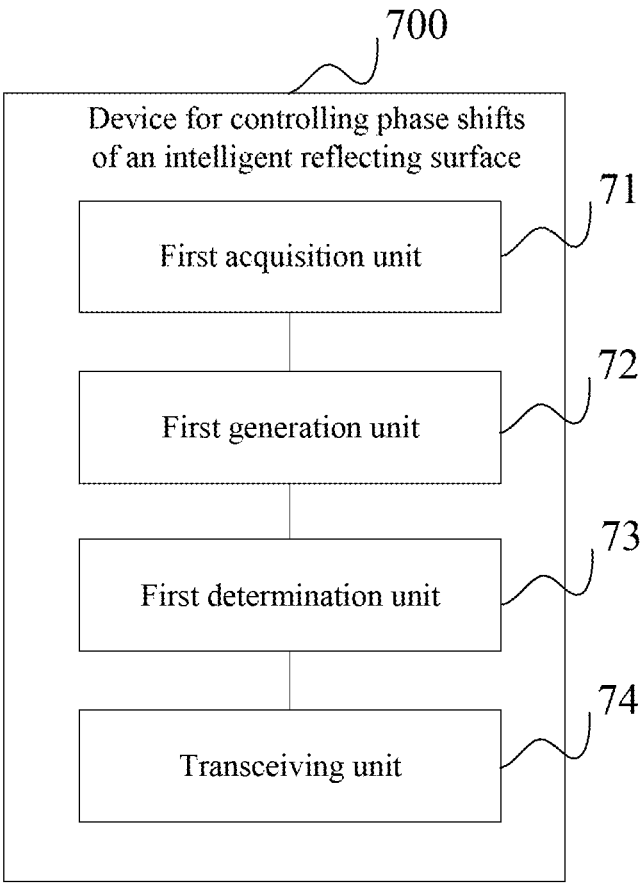
FIG. 7 is a schematic structural diagram of a device for controlling phase shifts of an IRS according to an embodiment of the present disclosure.

The phase shift control device of the IRS can be the phase shift processor mentioned above. A possible structure diagram of the phase shift control device of IRS is shown in FIG. 7. The phase shift control device of IRS 700 includes:

a first acquisition unit 71 configured to acquire multiple pieces of first received signal quality information at the receiver, where the multiple pieces of first received signal quality information represent the signal quality of receivers;

a first generating unit 72 configured to generate the first conditional sample statistics values according to the multiple pieces of first received signal quality information and the phase shift arrays corresponding to the signals;

a first determination unit 73 configured to determine the first phase shift array that meets the communication requirement according to the first conditional sample statistical values, and the first phase shift array includes the phase shift values for at least one reflective element of the IRS;

a transceiver unit 74 configured to send the first phase shift array.

Alternatively, the communication requirement is to enhance the signal quality of the receiver. The first determination unit includes (not shown in the figure):

a second acquisition unit configured to acquire the phase shift value based on the maximum value out of the first condition sample statistical values for each reflective element, and form the first phase shift array based on the acquired multiple phase shift values; or a second determination unit configured to determine the first phase shift array according to at least two first alternative phase shift arrays.

Alternatively, the second determination unit includes (not shown in the figure):

a third determination unit configured to determine the at least two first alternative phase shift arrays;

a third acquisition unit configured to acquire multiple pieces of second received signal quality information which represent the qualities of the received signal at the receiver based on each first alternative phase shift array respectively;

a second generating unit configured to generate the second conditional sample statistical values based on the multiple pieces of second received signal quality information and each first alternative phase shift array;

a fourth acquisition unit configured to acquire the first alternative phase shift array based on the maximum value out of the second conditional sample statistical values, and treat it as the first phase shift array.

Alternatively, the communication requirement is to decrease the received signal quality of the receiver. The first determination unit includes (not shown in the figure):

a fifth acquisition unit configured to acquire the phase shift value based on the minimum value out of the first conditional sample statistical values corresponding to each reflective element, and form the first phase shift array based on the acquired multiple phase shift values; or a fourth determination unit configured to determine the first phase shift array based on at least two second alternative phase shift arrays.

Alternatively, the fourth determination unit includes (not shown in the figures):

a fifth determination unit configured to determine the at least two second alternative phase shift arrays;

a sixth acquisition unit configured to acquire multiple pieces of third received signal quality information which represent the qualities of the received signals at the receiver based on each second alternative phase shift array respectively;

a third generating unit configured to generate the third conditional sample statistical values based on the multiple pieces of third received signal quality information and each second alternative phase shift array;

a seventh acquisition unit configured to acquire the second alternative phase shift array based on the minimum value out of the third conditional sample statistical values, and treat it as the first phase shift array.

Alternatively, the first phase shift array includes a first phase shift sub-array and a second phase shift sub-array. The first phase shift sub-array includes phase shifts of $\lfloor Nx \rfloor$ reflective elements of the IRS. The second phase shift sub-array includes phase shifts of $N-\lfloor Nx \rfloor$ reflective elements of the IRS.

The first determination unit includes the following (which is not shown in the figures):

an eighth acquisition unit configured to acquire the phase shift value based on the minimum value out of the first conditional sample statistical values corresponding to $\lfloor Nx \rfloor$ reflective elements, and form the first phase shift sub-arrays based on the acquired multiple phase shift values; and a ninth acquisition unit configured to acquire the phase shift value based on the minimum value out of the first conditional sample statistical values corresponding to $N-\lfloor Nx \rfloor$ reflective elements, and form the second phase shift sub-arrays based on the acquired multiple phase shift values.

Alternatively, the IRS includes N reflective elements. The first phase shift array includes the phase shifts of $Y_1$ reflective elements of the IRS, where $1 \leq Y_1 \leq N$, and Y 1 and N are positive integers.

The first acquisition unit is also configured to acquire the fourth received signal quality information at the receiver, where the fourth received signal quality information represent the qualities of the received signals at the receiver when phase shift values of $Y_1$ reflective elements of the IRS are determined and phase shift values of $N-Y_1$ reflective elements are not yet determined.

The first generating unit is also configured to generate the fourth conditional sample statistical value according to the fourth received signal quality information and the phase shift array corresponding to the signal.

The first determination unit is also configured to determine the second phase shift array that meets the communication requirement according to the fourth conditional sample statistical value, the second phase shift array includes the phase shift values of $Y_2$ reflective elements of the IRS, where $1 \leq Y_2 \leq N-Y_1$, and $Y_2$ is a positive integer.

Alternatively, the first received signal quality information is a piece of multi-dimensional signal quality information. The multi-dimensional signal quality information characterizes the communication performance of receivers in the MIMO scenario.

Alternatively, the first acquisition unit includes (which is not shown in the figures):

a tenth acquisition unit configured to receive the fifth received signal quality information of multiple receivers;

a sixth determination unit configured to determine the first received signal quality information from the fifth received signal quality information of multiple receivers.

Alternatively, the transceiver unit is also configured to receive a set of phase shift array modes. The set of phase shift array modes contains at least one of the following phase shift array modes.

The device also includes (which is not shown in the figures):

an eleventh acquisition unit configured to acquire the phase shift value based on the maximum value out of the first conditional sample statistical values corresponding to each reflective element, and form the first phase shift array based on the acquired multiple phase shift values; or a seventh determination unit configured to determine the first phase shift array according to at least two first alternative phase shift arrays; or a twelfth acquisition unit configured to acquire the phase shift value based on the minimum value out of the first conditional sample statistical values corresponding to each reflective element, and form the first phase shift array based on the acquired multiple phase shift values; or an eighth determination unit configured to determine the first phase shift array according to at least two second alternative phase shift arrays;

a storage unit, configured to store the correspondence between at least one phase shift array mode label and at least one phase shift array mode;

the transceiver unit also configured to receive a selected instruction from a user, where the selected instruction includes the label of the first phase shift array mode;

a selection unit, configured to select the corresponding phase shift array mode according to the label of the first phase shift array mode and the correspondence.

Alternatively, the shape of the IRS includes a folded book shape.

Alternatively, the first received signal quality information includes at least one of the following: an RSRP, an SINR, a spectral efficiency, a transmission rate, a sum of transmission rates of multiple receivers, a bit error rate, or a time delay.

All relevant contents of each step involved in the above embodiment can be referred to the functional description of the corresponding functional module, and will not be repeated here.

Figure 8:
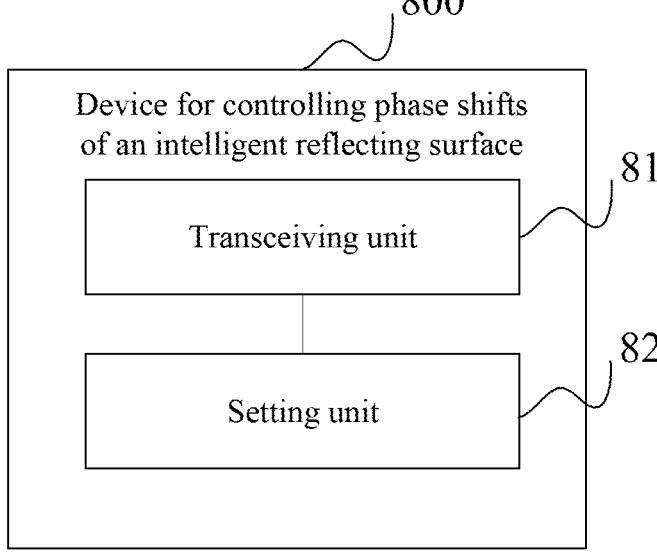
FIG. 8 is a schematic structural diagram of another device for controlling phase shifts of an IRS according to an embodiment of the present disclosure.

The phase shift control device of the IRS can be the phase shift controller. One possible structure of the phase shift control device of IRS is shown in FIG. 8. The phase shift control device of IRS 800 includes:

a transceiver unit 81 configured to receive the first phase shift array, the first phase shift array includes the phase shift values for at least one reflective element of the IRS that meets the communication requirement; and a setting unit 82 configured to set the phase shift values for at least one reflective element of the IRS according to the first phase shift array.

Figure 9:
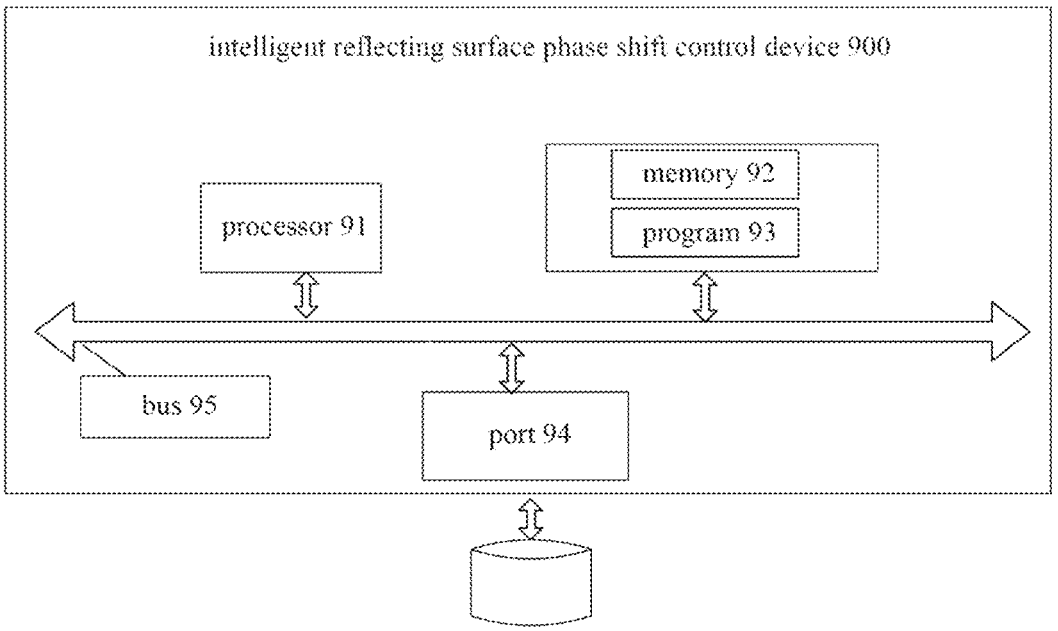
FIG. 9 is a schematic structural diagram of another device for controlling phase shifts of an IRS according to an embodiment of the present disclosure.

Please refer to FIG. 9 for another structural diagram of the phase shift control device of the IRS provided by the embodiment. The phase shift control device of IRS 900 includes: a processor 91, a memory 92, a bus 95, and an interface 94. Among them, the processor 91 is connected to the memory 92 and the interface 94. The bus 95 is connected to the processor 91, the memory 92, and the interface 94, respectively. The interface 94 is used to receive or send data. The processor 91 is a single-core or multi-core central processing unit, either a particular integrated circuit or one or more integrated circuits configured to implement an embodiment of the present disclosure. The memory 92 may be random access memory (RAM) or non-volatile memory, such as at least one hard disk memory. The memory 92 is used to store the computer-executable instructions. Specifically, the computer programs may include the instructions 93.

In this embodiment, when the processor 91 calls the program 93, it can cause the processor 91 in FIG. 9 to perform the operations performed by the phase shift processor or phase shift controller in the aforementioned embodiment which is shown in FIG. 3 or FIG. 6, and the details will not be repeated here.

It should be noted that in practical applications, the receiver and the signal detector can be the same device, for example, the signal detector is integrated into the receiver, or a separate device, for example, after the receiver receives the signal, the signal is forwarded to the signal detector, and the signal detector is used to measure the received signal. Alternatively, the receiver, the signal detector, and the phase shift processor may be the same device or separate from different devices, and the specific combination of the receiver, the signal detector, and the phase shift processor is not limited in the embodiment of the application.

It should be noted that in the practical application process, the IRS and the phase shift controller can be the same device or separate devices, which is not limited here.

In the embodiment of the present disclosure, the specific method performed by the phase shift processor is similar to the method performed by the phase shift processor in FIG. 3 and FIG. 6, and the details will not be repeated here. The specific method of the phase shift controller is similar to that of the phase shift controller in FIG. 3 and FIG. 6, and the details will not be repeated here.

It is understood that the phase shift controller or processor of the phase shift controller in the above embodiment of the application, or the processors provided in the above embodiment of the application, maybe a central processing unit (CPU), It can also be other general-purpose processors, digital signal processors (DSPS), application-specific integrated circuits (ASIC), etc., field programmable gate array (FPGA) or other programmable logic devices, discrete gates or transistor logic devices, discrete hardware components, etc. A general processor may be a microprocessor, or the processor may be any type of common processor.

It should also be understood that the number of processors in the phase shift controller and phase shift processor in the above embodiment can be one or more, and can be adjusted according to the actual application scenario. It is only illustrative and not limited here. The number of memories in the embodiment of the application may be one or more and can be adjusted according to the actual application scenario. It is only illustrative and not limited here.

It should be noted that when the phase shift controller or the phase shift processor includes a processor (or a processing unit) and memory, the processor and the memory should be integrated or the processor and the memory may be connected via an interface, and it can be adjusted according to actual application scenario and should not be limited.

The present disclosure provides a chip system that includes a processor for supporting the phase shift controller and the phase shift processor to implement the functions of the controller involved in the method, such as processing the data and/or information involved in the method. In one possible design, the chip system also includes memory which is used to hold the necessary program instructions and data. The chip system may be composed of a chip and may also include a chip and other discrete devices.

In another possible design, when the chip system is a chip in the user equipment or access network, the chip includes: a processing unit and a communication unit. The processing unit can be a processor, for example, and the communication unit can be an input/output interface, pin, circuit, etc. The processing unit may execute the instructions of the computer stored by the memory unit to cause the chips within the phase shift controller and phase shift processor, etc. to execute the steps performed by the phase shift controller and phase shift processor in the above embodiment of FIG. 3 and FIG. 6. Alternatively, the memory unit is the memory unit inside the chip, such as registers, caches, etc., and the memory unit can also be the memory unit outside the chip in the phase shift controller and phase shift processor, such as read-only memory (ROM) or other types of static storage devices that can store static information and instructions. random access memory (RAM), etc.

The embodiment of the application also provides a computer-readable storage medium on which a computer program is stored, and the computer program, when executed by the computer, performs the method flow of execution of either embodiment of the method with the controller of the phase shift controller and the phase shift processor. Correspondingly, the computer can be the phase shift controller and the phase shift processor.

It is understood that the controller or the processors mentioned in the above embodiment of the application, may be a central processing unit (CPU), It can also be other general-purpose processors, digital signal processors (DSPS), application-specific integrated circuits (ASIC), etc., field programmable gate array (FPGA) or other programmable logic devices, discrete gates or transistor logic devices, discrete hardware components, etc. A general processor may be a microprocessor, or the processor may be any type of common processor.

It should also be understood that the number of the phase shift controller and the processors or controllers in the phase shift processor or chip system in the above embodiment of the application may be one or more, and can be adjusted according to the actual application scenario, and is only illustrative and not limited here. The number of memories in the embodiment of the application may be one or more, and can be adjusted according to the actual application scenario. It is only illustrative and not limited here.

It should also be understood that the memory or readable storage medium of the phase shift controller and phase shift processor in the above embodiment of this application may be volatile memory or non-volatile memory or may include both volatile and non-volatile memory. Among them, the non-volatile memory can be a read-only memory (ROM), programmable ROM (PROM), erasable programmable ROM (PROM), erasable PROM (EPROM), etc., electrically erasable programmable read-only memory (EEPROM), or flash memory. Random access memory (RAM), which is used as an external cache. By way of illustrative, but not restrictive, many forms of RAM are available, such as static random access memory (SRAM), dynamic random access memory (DRAM), synchronous dynamic random access memory (synchronous DRAM), and synchronous random access memory (SRAM), double data rate synchronous dynamic random access memory (DDR SDRAM), enhanced synchronous dynamic random access memory (ESDRAM), double data rate SDRAM (DDR SDRAM) ESDRAM), synchlink dynamic random access memory (SLDRAM), and direct rambus random access memory (DR RAM).

A professional in the field can understand that the steps performed by the phase shift controller and phase shift processor or processor in whole or in part to realize the above embodiment can be instructed by the hardware or hardware which is called by a software program. The program may be stored in a computer-readable storage medium which may be read-only memory, random access memory, etc. Specifically, for example, the processing unit or processor may be a central processing unit, general purpose processor, digital signal processor (DSP), application-specific integrated circuit (ASIC), field Programmable gate Array (FPGA), or other programmable logic device, transistor logic device, hardware component or any combination thereof. Whether these functions are performed in hardware or software depends on the specific application and design constraints of the technical solution. A professional may use different methods to implement the described functions for each particular application, but such implementation shall not be considered beyond the scope of this application.

When using software to implement the function, the method steps described in the above embodiment may be implemented in whole or in part in the form of computer program products. A computer program product includes one or more computer instructions. When a computer program instruction is loaded and executed on a computer, the process or function according to the embodiment of this application is produced in whole or in part. The computer may be a general-purpose computer, a special-purpose computer, a computer network, or other programmable devices. Computer instructions may be stored in or transmitted from one computer-readable storage medium to another, for example, computer instructions can be transmitted from one website, computer, server, or data center to another website, computer, server, or data center by wire (e.g., coaxial cable, fiber optic, digital subscriber line (DSL) or wireless (e.g., infrared, wireless, microwave, etc.). A computer-readable storage medium can be any available media that a computer can access or a data storage device such as a server or data center that contains one or more available media integration. The available media may be magnetic media (e.g., floppy disk, hard disk, tape), optical media (e.g., BD), semiconductor media, and so on.

The terms "first", "second", etc. in the description and claims of this application and the above figures are used to distinguish similar objects and need not be used to describe a particular order or sequence. It should be understood that the terms so used are interchangeable where appropriate and that this merely describes how objects with the same attributes are distinguished in the description of embodiments of the present disclosure. In addition, the terms "including" and "having" and any variations thereof are intended to cover non-exclusive inclusion so that a process, method, system, product, or equipment including a series of units need not be limited to those units, but may include other units not clearly listed or inherent to those processes, methods, products or device.

The terms used in embodiments of the application are only used to describe particular embodiments and are not intended to restrict the application. The singular forms "a" and "the" as used in an embodiment of this application are also intended to include the majority form unless the context clearly indicates otherwise. It should also be understood that in the description of this application, unless otherwise stated, "/" means that the object is an "or" relationship, for example, A/B may denote A or B; The "and/or" in this application is only an association relation describing the associated object, indicating that there can be three kinds of relations, for example, A and/or B, which means that there is A alone, there is A and B together, and there is B alone, where A and B can be singular or plural.

Depending on the context, the word if used here can be interpreted as "in . . . ", "when . . . ", "in response to the determination" or "in response to detection". Similarly, depending on the context, the phrase "if determining . . . " or "if detecting . . . (stated condition or event)" can be interpreted as "when . . . is determined", "in response to determination of . . . ", "when. is detected", "in response to detection of . . . (stated condition or event)".

As mentioned above, the above embodiments are only used to illustrate the technical scheme of this application, but not to limit it. Although this application is explained in detail with reference to the aforesaid embodiments, ordinary technicians in the field should understand that they can still modify the technical scheme recorded in the aforesaid embodiments, or replace some of the technical features thereof by equivalent. Such modification or replacement shall not make the essence of the corresponding technical scheme out of the scope of the technical scheme of each embodiment of the application.

What is claimed is:

1. A method for controlling phase shifts of an intelligent reflecting surface (IRS), comprising:

acquiring multiple pieces of first received signal quality information at a receiver, where the multiple pieces of first received signal quality information represent qualities of signals received at the receiver;

generating first conditional sample statistical values based on the multiple pieces of first received signal quality information and phase shift arrays corresponding to the signals, where the first conditional sample statistical values each represent an average value of the first received signal qualities acquired when the phase shift of a single reflective element of the IRS is fixed at a specific phase shift value while phase shift values of the remaining reflective elements are randomly selected;

determining a first phase shift array that meets a communication requirement according to the first conditional sample statistical values, where the first phase shift array comprises a phase shift value for at least one reflective element of the IRS, the communication requirement comprising enhancing signal quality at the receiver or decreasing signal quality at the receiver; and configuring the IRS based on the first phase shift array.

2. The method of claim 1, wherein the determining first phase shift array that meets the communication requirement according to the first conditional sample statistical values comprises any one of implementations A1-A4:

A1: when the communication requirement is to enhance signal quality at the receiver, acquiring the phase shift value based on the maximum value out of first conditional sample statistical values for each reflective element, and forming the first phase shift array based on multiple acquired phase shift values;

A2: when the communication requirement is to enhance signal quality at the receiver, determining at least two first alternative phase shift arrays, wherein the first phase shift array, which is acquired based on phase shift values each determined based on the maximum value out of the first conditional sample statistical values for the corresponding reflective element, is taken as an optimal solution of the IRS, and the at least two first alternative phase shift arrays are taken as at least two alternative solutions for the optimal solution of the IRS;

acquiring multiple pieces of second received signal quality information which represent qualities of signals received at the receiver based on the first alternative phase shift arrays;

generating second conditional sample statistical values based on the second received signal quality information; and choosing the first alternative phase shift array that corresponds to the maximum value out of the second conditional sample statistical values as the first phase shift array;

A3: when the communication requirement is to decrease signal quality at the receiver, acquiring a phase shift value based on the minimum value out of first conditional sample statistical values for each reflective element, and forming the first phase shift array based on multiple acquired phase shift values; or A4: when the communication requirement is to decrease signal quality at the receiver, determining at least two second alternative phase shift arrays, wherein the first phase shift array, which is acquired based on phase shift values each determined based on the minimum value out of first conditional sample statistical values for the corresponding reflective element, is taken as an optional solution of the IRS, and the at least two second alternative phase shift arrays are taken as at least two alternative solutions for the optimal solution of the IRS;

acquiring multiple pieces of third received signal quality information which represent qualities of signals received at the receiver based on the second alternative phase shift arrays;

generating third conditional sample statistical values based on the third received signal quality information; and choosing the second alternative phase shift array that corresponds to the minimum value out of the third conditional sample statistical values as the first phase shift array.

3. The method of claim 2, further comprising:

receiving a set of phase shift array modes, where the set of phase shift array modes comprises at least one of phase shift array modes corresponding to the implementations A1-A4;

storing a correspondence between at least one phase shift mode label and the at least one phase shift array mode;

receiving a selecting instruction from a user, where the selecting instruction comprises a first phase shift array mode label; and selecting a corresponding phase shift array mode according to the first phase shift array mode label and the correspondence.

4. The method of claim 1, wherein the first received signal quality information is a piece of multi-dimensional signal quality information that represents a multi-antenna transmission signal quality.

5. The method of claim 1, wherein the IRS has a two-dimensional or a three-dimensional structure.

6. The method of claim 1, wherein the first received signal quality information comprises at least one of a reference signal received power (RSRP), a signal to interference plus noise ratio (SINR), a spectral efficiency, a transmission rate, a sum of transmission rates of multiple receivers, a bit error rate, or a time delay.

7. The method of claim 1, wherein the IRS comprises N reflective elements, and the method comprises:

when the communication requirement is to decrease signal quality at the receiver, acquiring a phase shift value based on the minimum value out of first conditional sample statistical values for each of $\lfloor Nx \rfloor$ reflective elements of the IRS, and forming a first phase shift sub-array based on multiple acquired phase shift values; acquiring a phase shift value based on the maximum value out of first conditional sample statistical values for each of $N-\lfloor Nx \rfloor$ reflective elements of the IRS, and forming a second phase shift sub-array based on multiple acquired phase shift values;

and forming the first phase shift array comprising the first phase shift sub-array and the second phase shift sub-array, wherein the first phase shift sub-array comprises the phase shift values of the $\lfloor Nx \rfloor$ reflective elements of the IRS, and the second phase shift sub-array comprises the phase shift values of the $N-\lfloor Nx \rfloor$ reflective elements of the IRS, where $0 < x < 1$.

8. A method for controlling phase shifts of an IRS, comprising:

acquiring multiple pieces of first received signal quality information at a receiver which represent qualities of signals received at the receiver;

generating first conditional sample statistical values based on the multiple pieces of first received signal quality information and phase shift arrays corresponding to the signals, where the first conditional sample statistical values each represent an average value of the first received signal qualities acquired when the phase shift of a single reflective element of the IRS is fixed at a specific phase shift value while phase shift values of the remaining reflective elements are randomly selected;

determining a first phase shift array that meets a communication requirement according to the first conditional sample statistical values, the first phase shift array comprising a phase shift value for at least one reflective element of the IRS, the communication requirement comprising enhancing signal quality at the receiver or decreasing signal quality at the receiver;

sending the first phase shift array, wherein the IRS comprises N reflective elements, and the first phase shift array comprises optimized phase shift values of $Y_1$ reflective elements of the IRS, where $1 \leq Y_1 \leq N$, and $Y_1$ and N are positive integers;

acquiring fourth received signal quality information at the receiver which represent qualities of signals received at the receiver when phase shift values of the $Y_1$ reflective elements of the IRS are determined and phase shift values of the $N-Y_1$ reflective elements are not yet determined;

generating fourth conditional sample statistical values according to the fourth received signal quality information and phase shift arrays corresponding to the signals, wherein the fourth conditional sample statistical values each represent an average value of the fourth received signal qualities acquired when the phase shifts of the $Y_1$ reflective elements of the IRS are fixed at the determined phase shift values while undetermined phase shift values of the $N-Y_1$ reflective elements are randomly selected;

determining a second phase shift array that meets the communication requirement according to the fourth conditional sample statistical values, wherein the second phase shift array comprises optimized phase shift values of the $Y_2$ reflective elements of the IRS, where $1 \leq Y_2 \leq N-Y_1$, and $Y_2$ is a positive integer; and iteratively performing the previous steps until the phase shift values of the N reflective elements of the IRS that meet the communication requirement are determined.

9. The method of claim 8, wherein the first received signal quality information is a piece of multi-dimensional signal quality information that represents a multi-antenna transmission signal quality.

10. The method of claim 8, wherein the IRS has a two-dimensional or a three-dimensional structure.

11. The method of claim 8, wherein the first received signal quality information comprises at least one of the following: an RSRP, an SINR, a spectral efficiency, a transmission rate, a sum of transmission rates of multiple receivers, a bit error rate or a time delay.

12. The method of claim 1, further comprising:

receiving the first phase shift array, wherein the configuring the IRS based on the first phase shift array comprises setting a phase shift value for the at least one reflective element of the IRS based on the first phase shift array.

13. A system for controlling phase shifts of an IRS, comprising an IRS, a signal detector, a phase shift processor, and a phase shift controller, wherein the signal detector is configured to:

detect qualities of signals received at a receiver, and acquire multiple pieces of first received signal quality information at the receiver which represent the qualities of the signal received at the receiver; and output the multiple pieces of first received signal quality information to the phase shift processor;

the phase shift processor is configured to:

acquire the multiple pieces of first received signal quality information from the receiver;

generate first conditional sample statistical values based on the multiple pieces of first received signal quality information and the phase shift arrays corresponding to the signals;

determine a first phase shift array that meets a communication requirement according to the first conditional sample statistical values, wherein the first phase shift array comprises a phase shift value for at least one reflective element of the IRS, and the communication requirement comprises enhancing signal quality at the receiver or decreasing signal quality at the receiver; and send the first phase shift array to the phase shift controller; and the phase shift controller is configured to set a phase shift value for the at least one reflective element of the IRS according to the first phase shift array.

14. The system of claim 13, wherein the phase shift processor is configured to perform at least one of implementations A1-A4:

A1: when the communication requirement is to enhance signal quality at the receiver, acquiring the phase shift value based on the maximum value out of first conditional sample statistical values for each reflective element, and forming the first phase shift array based on multiple acquired phase shift values;

A2: when the communication requirement is to enhance signal quality at the receiver, determining at least two first alternative phase shift arrays, wherein the first phase shift array, which is acquired based on phase shift values each determined based on the maximum value out of first conditional sample statistical values for the corresponding reflective element, is taken as an optimal solution of the IRS, and the at least two first alternative phase shift arrays are taken as at least two alternative solutions for the optimal solution of the IRS;

acquiring multiple pieces of second received signal quality information which represent qualities of signals received at the receiver based on the first alternative phase shift arrays;

generating second conditional sample statistical values based on the second received signal quality information; and choosing the first alternative phase shift array that corresponds to the maximum value out of the second conditional sample statistical values as the first phase shift array;

A3: when the communication requirement is to decrease signal quality at the receiver, acquiring the phase shift value based on the minimum value out of first conditional sample statistical values for each reflective element, and forming the first phase shift array based on multiple acquired phase shift values; or A4: when the communication requirement is to decrease signal quality at the receiver, determining at least two second alternative phase shift arrays, wherein the first phase shift array, which is acquired based on phase shift values each determined based on the minimum value out of first conditional sample statistical values for the corresponding reflective element, is taken as an optimal solution of the IRS, and the at least two second alternative phase shift arrays are taken as at least two alternative solutions for the optimal solution of the IRS;

acquiring multiple pieces of third received signal quality information which represent qualities of signals received at the receiver based on the second alternative phase shift arrays;

generating third conditional sample statistical values based on the third received signal quality information; and choosing the second alternative phase shift array that corresponds to the minimum value out of the third conditional sample statistical values as the first phase shift array.

15. A device for controlling intelligent reflecting phase shift, comprising a processor, wherein the processor is configured to be coupled to a memory, read instructions from the memory, and implement the method of claim 1 according to the instructions.

16. A device for controlling intelligent reflecting phase shift, comprising a processor, wherein the processor is configured to be coupled to a memory, read computer instructions from the memory, and implement the method of claim 8 according to the instructions.

17. A non-transitory computer-readable storage medium storing a computer program thereon, wherein the computer program, when executed by a processor, implements the method of claim 1.

18. A non-transitory computer-readable storage medium storing a computer program thereon, wherein the computer program, when executed by a processor, implements the method of claim 8.

* * * * *